US012551201B2

(12) United States Patent
McGillicuddy et al.

(10) Patent No.: US 12,551,201 B2
(45) Date of Patent: Feb. 17, 2026

(54) BONE ACCESS, BONE CAPTURE, AND ASPIRATION DEVICES

(71) Applicant: Cervos Medical LLC, Avon, MA (US)

(72) Inventors: Andrew McGillicuddy, Humarock, MA (US); Neil F. Duffy, Jr., Brighton, MA (US)

(73) Assignee: Cervos Medical LLC, Avon, MA (US)

( * ) Notice: Subject to any disclaimer, the term of this patent is extended or adjusted under 35 U.S.C. 154(b) by 1044 days.

(21) Appl. No.: 17/670,318

(22) Filed: Feb. 11, 2022

(65) Prior Publication Data

US 2022/0257220 A1 Aug. 18, 2022

Related U.S. Application Data

(60) Provisional application No. 63/149,062, filed on Feb. 12, 2021.

(51) Int. Cl.
A61B 10/02 (2006.01)

(52) U.S. Cl.
CPC ........ *A61B 10/025* (2013.01); *A61B 10/0275* (2013.01); *A61B 2010/0258* (2013.01)

(58) Field of Classification Search
CPC .............. A61B 10/0233; A61B 10/025; A61B 2010/0258; A61B 10/0275; A61B 10/0283
See application file for complete search history.

(56) References Cited

U.S. PATENT DOCUMENTS 10,231,716 B2   3/2019  McGillicuddy et al.
10,556,046 B2   2/2020  McGillicuddy
(Continued)

FOREIGN PATENT DOCUMENTS

WO   20147070804 A1   5/2014
WO    2015109100 A1   7/2015

OTHER PUBLICATIONS

Arrow OnControl Powered Bone Marrow Biopsy System, Teleflex product reference, 3 pages (2019).
Luo, Yuanqiang, et al., "Hollow Notched K-Wires for Bone Drilling With Through-Tool Cooling," Journal of Orthopaedic Research, 2297-2306 (2019).

*Primary Examiner* — Charles A Marmor, II
(74) *Attorney, Agent, or Firm* — Hamilton, Brook, Smith & Reynolds, P.C.

(57) ABSTRACT

A bone marrow aspiration device includes an outer cannula connected to an outer handle, and a first cannula that fits through the outer cannula and extends beyond a distal end of the outer cannula. The first cannula is connected to a first handle including a mating feature. A removable sharp stylet fits coaxially through the first cannula and is connected to a stylet handle including a mating feature to engage with the mating feature of the first handle, to couple the stylet handle to the first handle. A proximal end of stylet forms an adapter to couple to a drill, the first cannula and stylet rotating together when driven by the drill coupled to the adapter. A second cannula fits through the first cannula once the stylet is removed, a distal end of the second cannula closing off the distal end of the first cannula but leaving open one or more side apertures in the first cannula, to aspirate bone marrow through the open side apertures. A screw mechanism, formed by a lead screw extending from the first handle and engaging a threaded portion of the outer handle, allows the first cannula to be retracted through the outer cannula with rotation of the first handle relative to the outer handle.

26 Claims, 20 Drawing Sheets

(56) References Cited

U.S. PATENT DOCUMENTS

| | | |
|---|---|---|
| 10,568,661 B2 | 2/2020 | McGillicuddy |
| 10,993,707 B2 | 5/2021 | McGillicuddy |
| 11,039,817 B2 | 6/2021 | McGillicuddy |
| 11,478,231 B2 | 10/2022 | McGillicuddy et al. |
| 11,497,480 B2 | 11/2022 | McGillicuddy |
| 2003/0225411 A1* | 12/2003 | Miller ................ A61B 17/3496 606/80 |
| 2004/0077973 A1 | 4/2004 | Groenke et al. |
| 2004/0153005 A1 | 8/2004 | Krueger |
| 2008/0177200 A1* | 7/2008 | Ikehara ................ A61B 10/025 600/567 |
| 2012/0172907 A1* | 7/2012 | Lee Shee ........... A61B 17/1671 606/190 |
| 2015/0289858 A1* | 10/2015 | McGillicuddy ...... A61B 10/025 600/566 |
| 2016/0030013 A1* | 2/2016 | Harrison, IV ......... A61B 10/04 600/567 |
| 2016/0331878 A1* | 11/2016 | McGillicuddy ......... A61M 1/86 |
| 2019/0328370 A1* | 10/2019 | Muse .................. A61B 10/0266 |
| 2020/0205792 A1 | 7/2020 | McGillicuddy |
| 2020/0305930 A1 | 10/2020 | McGillicuddy |
| 2021/0315553 A1 | 10/2021 | McGillicuddy |

* cited by examiner

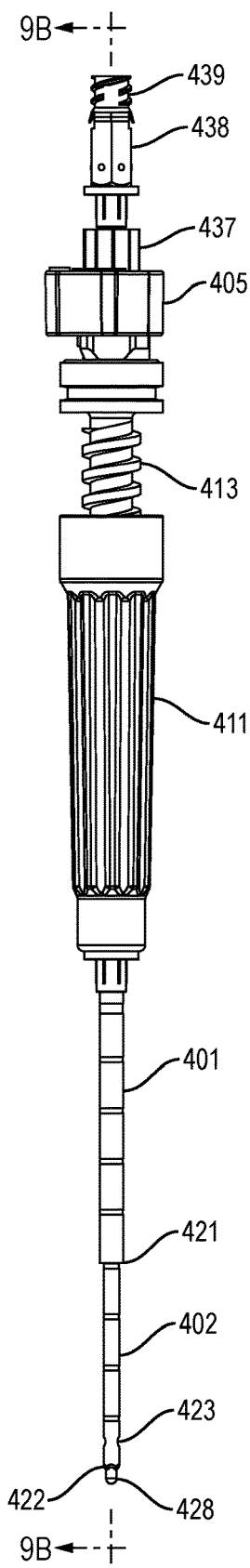
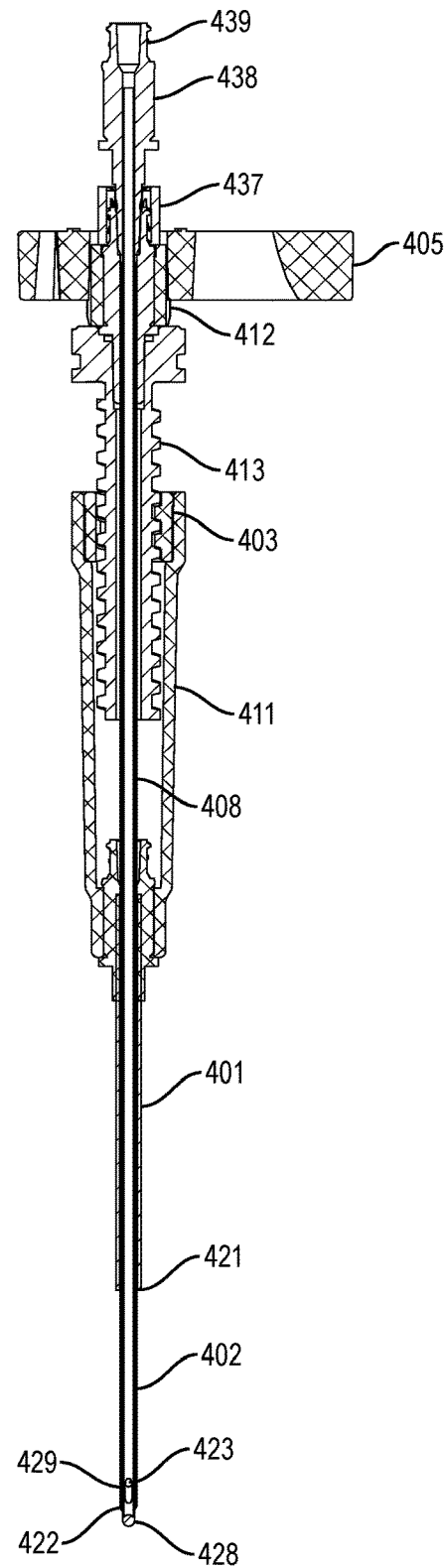
FIG. 9A
FIG. 9B

BONE ACCESS, BONE CAPTURE, AND ASPIRATION DEVICES

RELATED APPLICATION(S)

This application is claims the benefit of U.S. Provisional Application No. 63/149,062, filed on Feb. 12, 2021. The entire teachings of the above application(s) are incorporated herein by reference.

BACKGROUND

The end of long bones above a joint can become diseased in patients with osteoarthritis. The diseased bone can be treated to alleviate pain experienced by the patients. Currently, bone is typically treated with cement, bone marrow aspirate, hyaluronic acid, or other flowable substances that are injected into the bone through a cannula.

A Kirschner wire (K-wire) is a common tool in clinical orthopedic surgery for bone fracture fixation. Tools such as drill bits and saws are available to harvest healthy bone for transplantation. Cannulated drills and cannulas with a K-wire stylet driver exist to access the area of bone where the clinician wants to inject cement or another treating composition.

In bone marrow aspiration, a needle is used to withdraw a sample of the fluid portion of the marrow. In bone marrow biopsy, a needle is used to withdraw a sample of the solid portion of the marrow, e.g., a bone dowel. Bone marrow aspiration can be performed alone, but is often combined with bone marrow biopsy.

Trephine needles to harvest bone dowels exist for use in hematology or histology. Some of the hematology trephine needles are drill enabled. However, these drill-enabled needles need an intervening piece to connect a non-sterile, custom drill to the sterile cannula of the needle. The custom drills and accessories do not lend themselves to standard operating room procedures.

SUMMARY

Disclosed are devices and associated methods that allow a clinician to use a standard drill, e.g., a K-wire drill, to access bone, capture a bone dowel, or obtain a bone marrow aspirate. The devices and methods further allow the clinician to transplant the bone dowel using a standard drill, e.g., a K-wire assisted drill. The devices allow for both forwards (e.g., clockwise) and backwards (e.g., counterclockwise) drilling.

A bone marrow aspiration device includes an outer cannula connected to an outer handle at a proximal end of the outer cannula, and a first cannula that fits coaxially through the outer cannula and extends beyond a distal end of the outer cannula. The first cannula, which includes at least on side aperture near a distal end of the first cannula, is connected to a first handle at a proximal end of the first cannula. The first handle includes a mating feature.

A removable sharp stylet fits coaxially through the first cannula. The stylet is connected to a stylet handle that includes a mating feature to engage with the mating feature of the first handle, to couple the stylet handle to the first handle. The stylet has a length such that the distal end of the stylet extends beyond the distal end of the first cannula when the stylet handle and first handle are coupled. The distal end of the stylet and the distal end of first cannula are configured to penetrate bone. A proximal end of stylet forms an adapter to couple to a drill, the first cannula and stylet rotating together when driven by the drill coupled to the adapter.

The aspiration device includes a screw mechanism formed by a lead screw extending from the first handle and engaging a threaded portion of the outer handle. The screw mechanism allows the first cannula to be retracted through the outer cannula with rotation of the first handle relative to the outer handle.

A second cannula fits coaxially through the first cannula once the stylet is removed. A distal end of the second cannula is configured to close off the distal end of the first cannula and leave open the at least one side aperture of the first cannula, the second cannula defining a lumen to aspirate bone marrow through the at least one open side aperture.

The outer cannula can be 8 gauge, the first cannula 11 gauge, and the second cannula 14 gauge.

The first cannula can extend at least 2 centimeters but less than 8 centimeters beyond the distal end of the outer cannula.

The distal end of the outer cannula can be blunt, to enable the distal end to rest against but not penetrate the bone.

The second cannula can include a distal luer connector to connect to a luer connector at the first cannula in an air-tight manner.

The second cannula can include a proximal luer connector to connect to a syringe in an air-tight manner.

The one or more side apertures of the first cannula can be less than 2 centimeters from the distal end of the first cannula.

The mating feature of the first handle can include a keyway, such keyway can include a central recess and adjacent ridges. The mating feature of the stylet handle can include a key. Such key can include a finger receivable in the central recess with a linear motion of the finger, the finger including a slot to engage one of the ridges of the keyway with a rotational motion of the finger.

The aspiration device can include a detachable winged handle that is configured to couple to the first handle of the first cannula to assist with rotation of the first handle.

The aspiration device can further include a removable blunt stylet that fits coaxially through the first cannula once the sharp stylet is removed. The blunt stylet is connected to a blunt stylet handle that includes a mating feature to engage with the mating feature of the first handle, to couple the stylet handle to the first handle. The blunt stylet can have a length such that a distal end of the stylet extends beyond the distal end of the first cannula when the stylet handle and first handle are coupled.

The sharp stylet, the blunt stylet, or both can be configured to close off the distal end of the first cannula and the at least one side aperture.

The screw mechanism can be configured to cause relative linear motion between the outer cannula and the first cannula with relative rotation of the outer handle and the first handle.

A method for aspirating bone marrow with the aspiration device includes inserting the first cannula and the sharp stylet of the aspiration device into bone, removing the sharp stylet, inserting the second cannula through the first cannula, the distal end of the second cannula closing off the distal end of the first cannula and leaving open the at least one side aperture of the first cannula, moving the outer cannula towards the bone and relative to the first cannula using the screw mechanism by rotating the outer handle relative to the first handle, and aspirating bone marrow through the at least one open side aperture. The method can include retracting the first cannula and second cannula from the bone and through the outer cannula using the screw mechanism by rotating the first handle relative to the outer handle, and aspirating additional bone marrow through the at least one open side aperture.

A bone access device includes a cannula having a proximal end and a distal end and defining a lumen between the distal and proximal ends, the distal end configured to penetrate a bone of a patient and the proximal end connected to a cannula handle.

The bone access device further includes a removable stylet having a proximal end and distal end, the stylet receivable in the lumen of the cannula and configured to extend beyond the distal end of the cannula. The distal end of the stylet is configured to penetrate the bone of the patient. The proximal end of the stylet extends through a stylet handle connected to the stylet. The proximal end can form a post that protrudes from the stylet handle and that is shaped and sized to fit a drill. The stylet handle and cannula handle are configured to mate such that the stylet and stylet handle can rotate independently of the cannula and cannula handle in clockwise and counter clockwise directions for a limited amount of rotation before both the cannula handle and connected cannula and the stylet handle and connected stylet rotate together.

The limited amount of rotation can be less than 360 degrees.

The proximal end of the stylet that can form a post can protrude at least 2.5 centimeters beyond the stylet handle.

The cannula handle can include a luer connector and the stylet handle can include a recess to receive the luer connector.

To mate the stylet handle to the cannula handle, the cannula handle can define a keyway and the stylet handle can define a key receivable in the keyway.

The keyway of the cannula handle can include a first keyway on one side of the cannula handle and a second keyway on an opposite side of the cannula handle.

The key of the stylet handle can include a first key receivable in the first keyway and a second key receivable in the second keyway.

The first and second keyways can include respective first and second recesses in the cannula handle, and the first and second keys can be respective first and second fingers extending from the stylet handle. The first and second recesses can each be defined by two sidewalls connected by a convex surface. The first and second fingers can each define a concave surface complimentary to the convex surface.

The first finger of the stylet handle can include a lip formed at an end of the first finger and a slot formed along a length of the first finger.

The first keyway of the cannula handle can include at least two ridges adjacent a central recess, the lip of the finger receivable in the central recess with linear motion of the finger, the slot of the finger configured to engage with one of the ridges with rotation of the finger.

A handle system for a bone access device includes a first handle and a second handle. The first handle is connected to a proximal end of a first cannula defining a lumen, the first handle including a luer connection. The second handle is connected to a removable stylet or a second cannula, the stylet or second cannula receivable in the lumen of the first cannula through the luer connection. A proximal end of the stylet or second cannula extends through the second handle, the proximal end forming a post that protrudes from the second handle and that is shaped and sized to fit a drill. The first handle and second handle are configured to mate such that the stylet or second cannula and the second handle can rotate independently of the first cannula and first handle in both clockwise and counter clockwise directions for a limited amount of rotation, e.g., less than 360 degrees of rotation, before both the first handle and connected first cannula and the second handle and connected stylet or second cannula rotate together.

A bone dowel capture device includes a first cannula having a tapered swage at a distal end and being connected to a first cannula handle at a proximal end.

A removable first stylet fits coaxially through the first cannula, the first stylet connected to a first stylet handle and forming a first adapter at a proximal end to couple directly to a drill. The first stylet handle is configured to mate with the first cannula handle, the first stylet having a length such that a distal end of the first stylet extends beyond the distal end of the first cannula when the first stylet handle and first cannula handle are mated. The distal end of the first stylet is configured to penetrate bone. The first stylet and first cannula are configured to rotate in tandem when the first stylet is driven by a drill coupled to the first adapter.

A removable second stylet fits coaxially through the first cannula once the first stylet is removed, the second stylet connected to a second stylet handle and forming a second adapter at the proximal end to couple directly to a drill. The second stylet handle is configured to mate with the first cannula handle, the second stylet having a length such that a distal end of the second stylet does not extend beyond the distal end of the first cannula when the second stylet handle and first cannula handle are mated. The second stylet configured to leave a length of a distal portion of the first cannula hollow. The second stylet and first cannula are configured to rotate in tandem when the second stylet is driven by a drill coupled to the second adapter.

A second cannula fits coaxially through the first cannula once the second stylet is removed, the second cannula connected to a second cannula handle. The second cannula has a length such that a distal end of the second cannula extends to approximately the distal end of the first cannula. The distal end of the second cannula has a portion of a circumference along a length of the second cannula removed, the removed portion having a length of about the length of the distal portion of the first cannula that is left hollow by the second stylet. The second cannula is configured to cooperate with the first cannula to capture a bone dowel in the hollow distal portion of the first cannula.

The length of the hollow distal portion of the first cannula can be at least 1 centimeter and may be 4 or more centimeters.

The second cannula can form a third adapter at the proximal end to couple directly to a drill. The second cannula handle can be configured to mate with the first cannula handle. At least one of the first, second, and third adapters can be a K-wire adapter.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 9A is a side view of the device of FIG. 7 illustrating the second (aspiration) cannula inserted through the first (inner) cannula and outer cannula after removal of the stylet(s).

FIG. 9B is a section view of the device of FIG. 9A.

DETAILED DESCRIPTION

Figure 1:
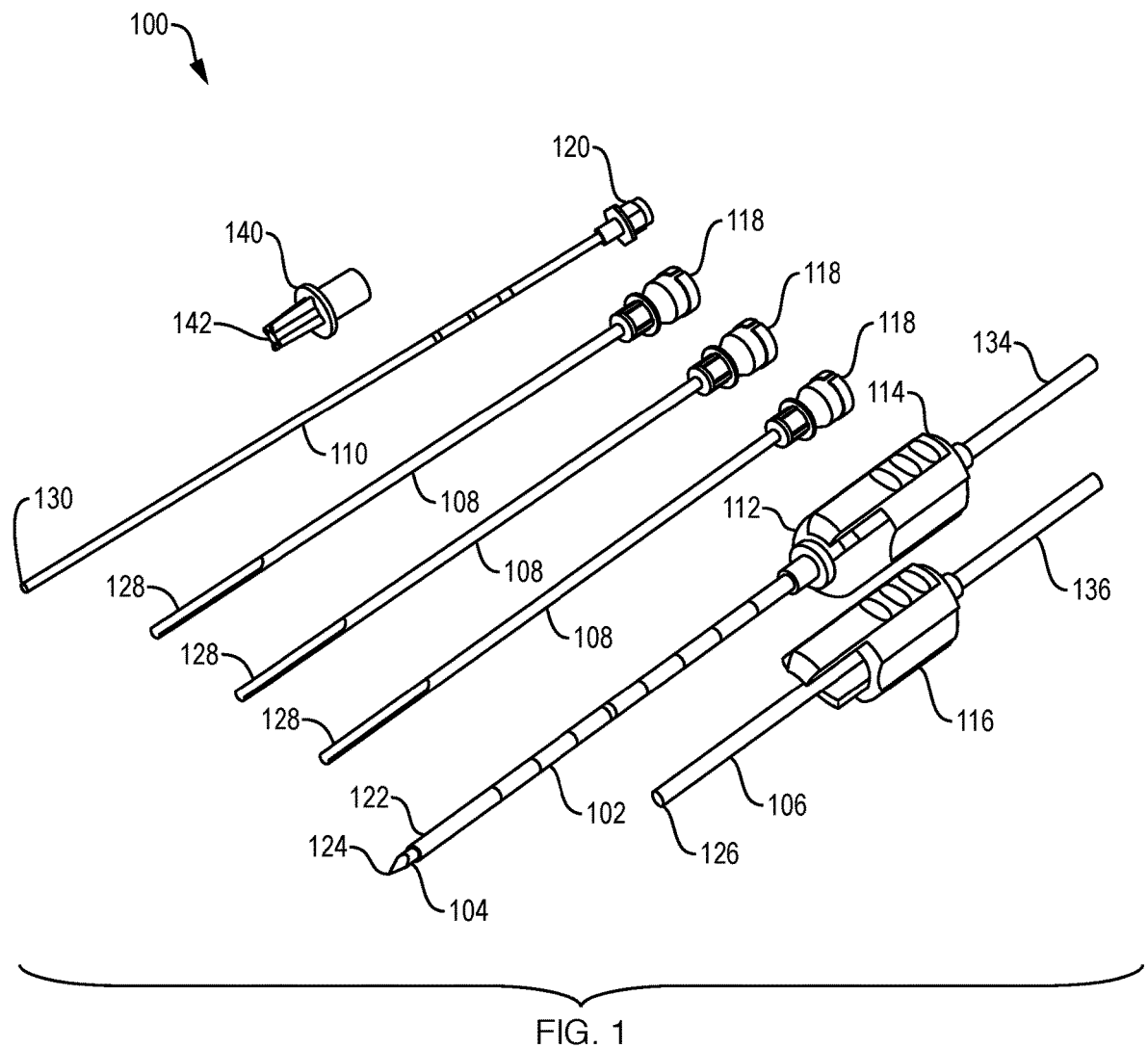
FIG. 1 illustrates a bone dowel harvesting device including a cannula, interchangeable stylets, accessory cannulas, and a push rod, according to an example embodiment.

A description of example embodiments follows.

Tools such as drill bits and saws are available to harvest healthy bone for transplantation. Cannulated drills and cannulas with a K-wire stylet driver exist to access the area of bone where the clinician wants to inject cement or another treating composition. Trephine needles to harvest bone dowels exist for use in hematology or histology. Example bone biopsy and aspiration devices are described in US2004/0153005A1 to Krueger and US2004/0077973A1 to Groenke et al. Some hematology trephine needles are drill enabled. As example drill enabled device is the Arrow® OnControl® powered bone marrow biopsy system (Teleflex, USA). However, drill enabled needles for taking a solid bone dowel typically have an intervening piece, which is needed to connect the needle to a non-sterile, custom drill. These custom drills and accessories to fit the sterile hub of the needle cannula or needle stylet to the non-sterile drill do not lend themselves to operating room (O.R.) procedures. The custom fitting means these cannulas cannot be used interchangeably with standard O.R. drills. These custom drills attach to a custom hub on the handle of the stylet or hub of the cannula on one end and the chuck of the drill on the other end. The custom drills do not fit a standard sterilization validation for use in an operating room. Consequently, these custom drills are typically not found in an O.R. setting. They are mainly used for histological purposes only.

A new use of trephine bone dowels is to transplant these dowels into another part of the body using a cannula with the same or similar dimensions but without the swage on the distal end. To accomplish this unique kind of an orthopedic procedure, a device should preferably work with standard O.R. drills used by orthopedic surgeons, to enable a surgeon to harvest and transplant bone dowels, which are non-flowable, using a standard off-the-shelf drill, ubiquitously available in an operating room. A simple to use tool to perform this type of surgery is not available currently. A bone dowel is typically a small amount of bone. Use of a bone dowel in an orthopedic procedure can be supplemented with bone marrow aspirate, as further described herein. The term standard O.R. drill refers to a drill that can be used for multiple surgical tools and that fits a universal wire fitting, not just the example fitting described in this application.

In order to capture a bone dowel in the cannula of a trephine needle, the needle is advanced, either manually or powered by a drill, through trabecular bone. Typically, this is done with the entire lumen of the cannula, the handle attached to the cannula, and the luer connector being open, i.e., a fluid path is open from the distal tip of the cannula to the proximal hub end of the handle. The handle is the most distal part of the device.

A non-intuitive feature of embodiments described herein is to close off the upper part of the cannula, leaving the lower part open. This feature, to close off the upper half, advantageously allows for a drill feature (e.g., a drill adapter) to connect to a standard chuck in an operating room. Alternatively, another non-intuitive feature is to have the feature in the handle that attaches to the drill be a cannula, thus keeping the fluid path patent throughout both cannulas when the handles are joined together. Both embodiments are further described herein: a solid wire and a tube that extends from the proximal end of a handle, the wire and tube meant to connect to the chuck of drill. In both designs, the handle of the cannula is not the most proximal end of the assembled device. Instead, the drill adapter is the most proximal end of the device.

It is believed that transplanting solid, healthy bone into an area of diseased bone can repair the diseased bone. Harvesting bone in a cannula means that the bone can be delivered through a similar sized cannula. Bone is not flowable. The devices and methods described herein provide the special tools needed to harvest and transplant solid bone to be transplanted into an area of unhealthy bone, such as at the ends of long bones adjacent to joints that have the symptoms of osteoarthritis. Current tools facilitate injecting flowable materials only. Healthy bone and diseased bone will need to be accessed with a cannula. Orthopedic surgeons are familiar with drills and several drills are available in an O.R. suite. It is believed that harvesting and transplanting bone dowels through cannulas that can be drill enabled will improve medicine. This new way of treating bone can be accomplished by the example devices and methods described herein. The technical solution provided in this application offers improvements over prior approaches to bone marrow biopsy and treatment of diseased bone, which have not appreciated the way of treating bone defects in the manner described here. Without understanding the problem, there is no motivation to create a solution.

FIG. 1 illustrates a bone access and bone dowel harvesting device 100 according to an example embodiment. The device 100 includes a cannula 102, e.g. an 8-gauge cannula, which is connected to a handle 112. The device is designed to be powered by a drill. This device allows the capture of living autogenous bone. A removable, sharp stylet 104 is used to penetrate cortical bone. The stylet has a sharp, distal end 124 and is connected to a stylet handle 114, which is configured to couple to the cannula handle 112, as illustrated in the FIG. 1. A second, shorter stylet 106 is used to advance the cannula 102 into bone to capture the core sample, once the sharp stylet 104 has been removed. The cannula 102 includes a tapered distal end 122, also referred to as swage tip, to capture and hold the core sample within the lumen of the cannula. The second stylet 106 has a blunt distal end 126 and is connected to a handle 116. As illustrated, each stylet handle 114, 116 includes a respective adapter 134, 136 on the proximal end of the stylet that is a solid post or wire, e.g., a K-wire, to couple to a drill.

The device 100 can be directed at various angles to the initial trajectory to allow for multiple dowels to be taken. This device can be used in conjunction with a bone marrow aspiration device and with graft material, such as the MARROWCELLUTION Bone Marrow Aspiration Devices and the CELLFUSE Graft Material offered by CERVOS Medical LLC (Marshfield, MA). Combining marrow aspirate with autogenous bone and a graft extender allows clinicians to fill boney defects using the patient's own cells as the engine for bone healing. The combination of all three provide cells, signals and a scaffold—the building blocks for repairing bone.

The cannula handle 112 includes a center keyway that is configured to receive a finger key of the stylet handles 114, 116, to couple the handles. The keyway and key allow rotation in both directions of the two handles assembled together, through an interference fit to the left and right of the extended finger of one of the stylet handles 114, 116. The two handles assembled together can only be separated through the center keyway.

The short stylet 106 allows the cannula 102 to be advanced through bone leaving the distal end of the cannula 102 open to capture a bone sample. This happens after the sharp stylet 104 that protrudes past the end 122 of the cannula has been removed. A spoon cannula 108 (or open stylet) can be inserted into the cannula 102 to capture the dowel sample in the distal, open portion 128. The cannula 108 has handle 118. As illustrated, multiple cannulas 108 can be provided, to take multiple core samples. A solid push rod 110 can be used to clear the bone sample from the spoon cannula 108 or, if need be, from the cannula 102. The push rod includes a blunt distal end 130 and a handle 120.

Also shown is a cap 140 that is configured to fit over the distal end 122 of the first cannula 102. The cap can be used, in combination with a push rod, e.g., push rod 110, to recover a bone dowel that is lodged inside the distal, tapered end of the cannula 102. When recovering the lodged bone dowel in this way, the cap covers the sharp, distal end of the cannula, to prevent injury to the clinician handling the cannula. The cap 140 includes a through-hole 142 sized to receive the push rod, to allow access to the lumen of the first cannula 102. The push rod is inserted through the hole 142 in the cap and into the distal end of the cannula, to push the bone dowel through the cannula 102 and out the proximal end of the cannula.

Figure 2:
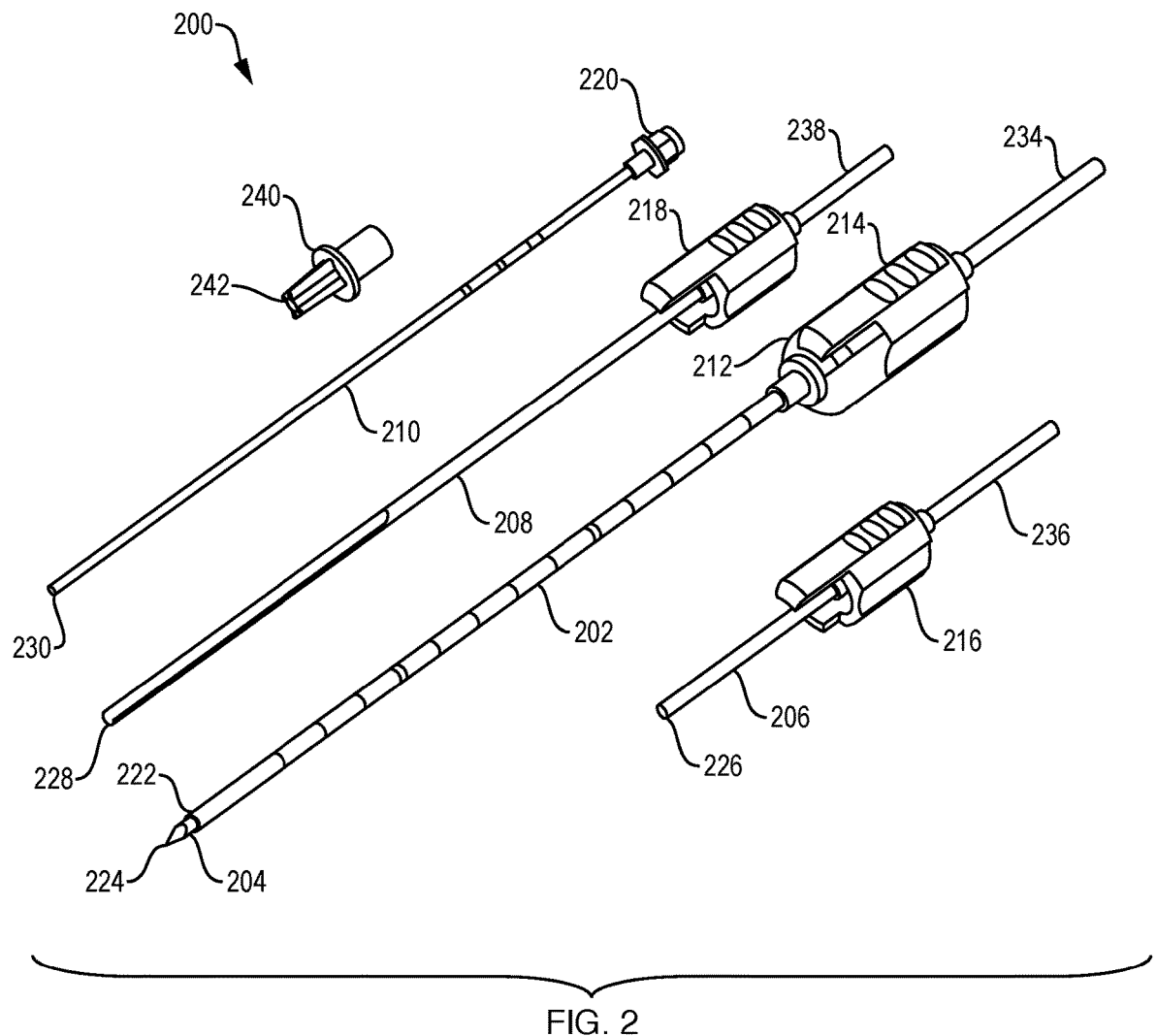
FIG. 2 is another bone dowel harvesting device including a cannula, interchangeable stylets, an accessory cannula, and a push rod, according to an example embodiment.

FIG. 2 illustrates a bone dowel harvesting device 200 according to another example embodiment. The bone dowel harvesting device 200 includes a cannula 202, e.g., an 11-gauge cannula, and is designed to be powered by a drill. As with device 100, the device 200 allows for the capture of living autogenous bone. A sharp stylet 204, having a sharp tip 224 at its distal end and an adapter 234 at its proximal end, is receivable in the cannula 202. A handle 214 of the stylet 204 is configured to couple to handle 212 of the cannula 202. The stylet 204 can be used to penetrate the cortical bone. The sharp stylet 204 is then removed, and a second, shorter stylet 206 is used to advance the cannula 202 to capture the core sample, the distal end 222 of the cannula being tapered to hold the sample captures sample within the cannula. The device 200 can be directed at various angles to the initial trajectory to allow for multiple bone dowels to be taken.

As with device 100, the device 200 can advantageously be used in conjunction with the bone marrow aspiration devices and graft material. For example, the device 200 can be used in conjunction with a sub-chondral bone access needle, such as device 500 described below and illustrated in FIG. 13. The access needle creates a working channel into the bone. In one example, the 11-gauge dowel harvesting cannula 202 is 3 cm longer than the access cannula 500 and allows the clinician to remove 3 cm of bone distal to the end of the access cannula. This bone sample can be transplanted if obtained from healthy bone, discarded if obtained from an area of necrotic bone, or sent off for histological examination. Combining marrow aspirate with autogenous bone and a graft extender allows clinicians to fill boney defects using the patient's own cells as the engine for bone healing. The combination of all three provide cells, signals and a scaffold, which are considered the building blocks for repairing bone.

The short stylet 206 has a distal end 226 that can be blunt and a proximal end 236 that can form an adapter configured to couple to a drill. The short stylet 206 allows the cannula 202 to be advanced through bone leaving the distal end 222 of the cannula 202 open to capture a sample. This happens after the sharp stylet 204 that protrudes past the end of the cannula 202 has been removed. A spoon cannula (open stylet) 208 includes a spoon or trough shaped distal end 228 and can be inserted through the cannula 202 to capture the dowel sample in the distal, open portion 228. The cannula 208 has a handle 218 to couple to the handle 212. The cannula 208 further includes an adapter 238 on the proximal end that is a hollow post, not a solid wire, to receive a push rod 210. The solid push rod 210, which has a blunt distal end 230 and includes a handle 220, can be used to clear the bone specimen from the cannula 208.

Also shown in FIG. 2, a cap 240 can be provided, which is similar to cap 140 described above and illustrated in FIG. 1. The cap 240 is configured to fit onto the distal end 222 of the first cannula 202. A hole 242 in the cap allows the push rod 210 to be inserted through the cap and into the lumen of first cannula 202. A removable, winged handle, similar to handle 405 illustrated in FIG. 7, may be provided, to couple to the handle 212 of the cannula 202.

FIGS. 3-6 illustrate a procedure for obtaining a bone dowel from the proximal tibia using a bone capture device 300 according to an example embodiment.

Figure 3:
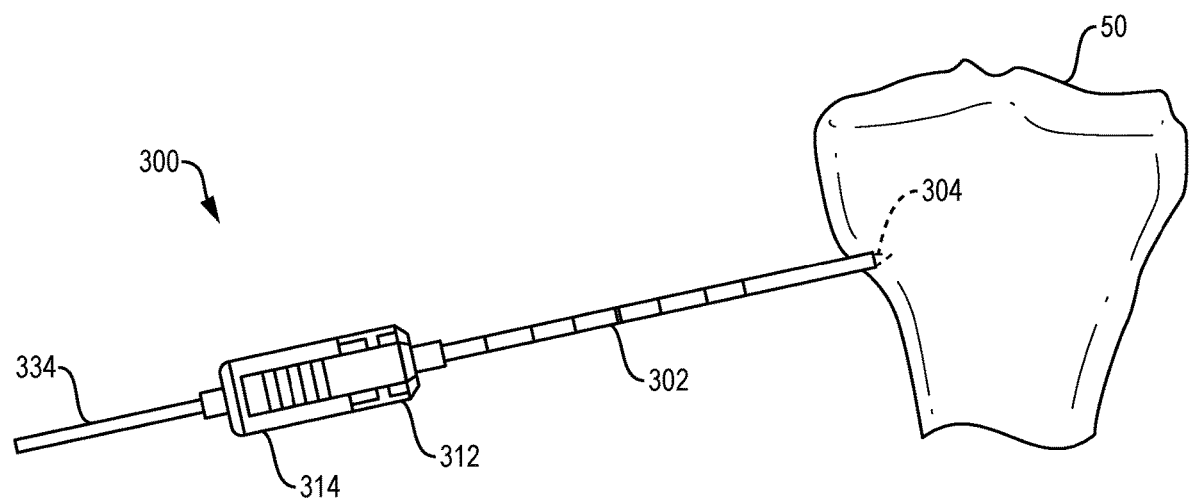
FIG. 3 illustrates placement of a bone access device at a biopsy site for obtaining a bone dowel from the proximal tibia.

As illustrated in FIG. 3, following proper placement technique, locate the device 300 including cannula 302 and stylet 304 adjacent to the biopsy site at bone 50. Stylet handle 314 and cannula handle 312 are coupled though respective mating features on each handle.

Using a surgical drill (now shown) with appropriate attachments to couple to adapter 334 of stylet handle 314, drill clockwise to advance the cannula 302 and stylet 304 of the device into the bone. Entrance into the marrow cavity is generally detected by decreased resistance.

Unlock the stylet handle 314 by rotating it to the center position and remove the stylet 304 from the cannula 302.

Figure 4:
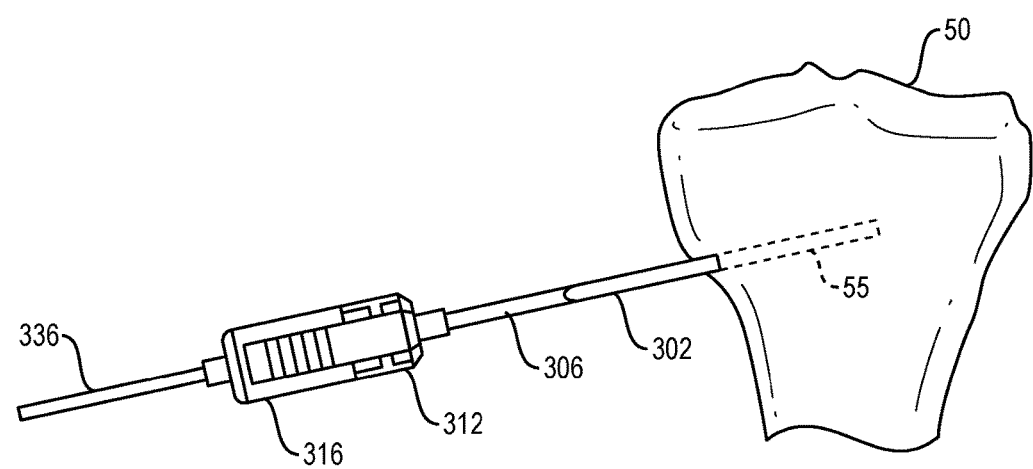
FIG. 4 illustrates the bone access device of FIG. 3 after the device has been advanced into the bone, the sharp stylet removed, and a blunt stylet inserted through the cannula.

Install the shorter blunt stylet 306 into the cannula 302, the blunt stylet handle 316 coupling to cannula handle 312 via respective mating features. FIG. 4 illustrates the bone access device after the device has been advanced into the bone 50, the sharp stylet 304 removed, and the blunt stylet 306 inserted through the cannula 302. Via adapter 336 of the blunt stylet 306, couple the stylet 306 to a surgical drill. Very slowly advance the device by drilling clockwise until a depth of about 2-3 cm is achieved. A bone dowel 55 is captured in the open distal end of cannula 302.

Next, remove the blunt stylet 306 and assemble an accessory cannula 308 into the cannula 302. The accessory cannula 308 has the distal end 328 shaped like a spoon, similar to cannula 108 of FIG. 1 or the cannula 208 of FIG. 2.

Figure 5:
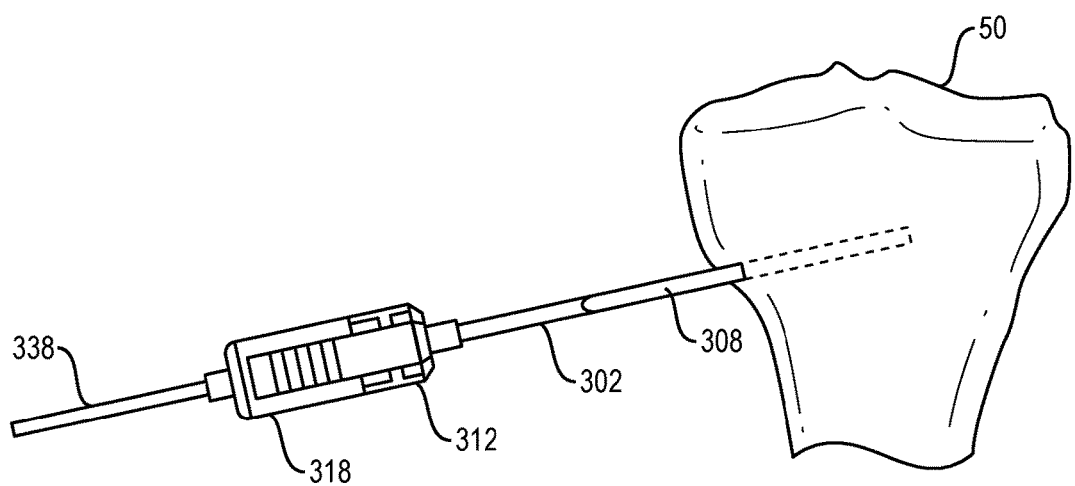
FIG. 5 illustrates the bone access device of FIG. 4 after the blunt stylet has been removed and an accessory cannula (e.g., spool cannula) inserted through the cannula.

FIG. 5 illustrates the bone access device after the blunt stylet 306 has been removed and an accessory cannula 308 inserted through the cannula 302. The handle 318 of the cannula 308 is coupled to the handle 312 of cannula 302.

Using a surgical drill (not shown) with appropriate attachments to couple to the adapter 338 extending from the handle 318 of the cannula 308, drill counter clockwise to remove both the cannula 302 and the accessory cannula 308 from the bone 50.

Figure 6:
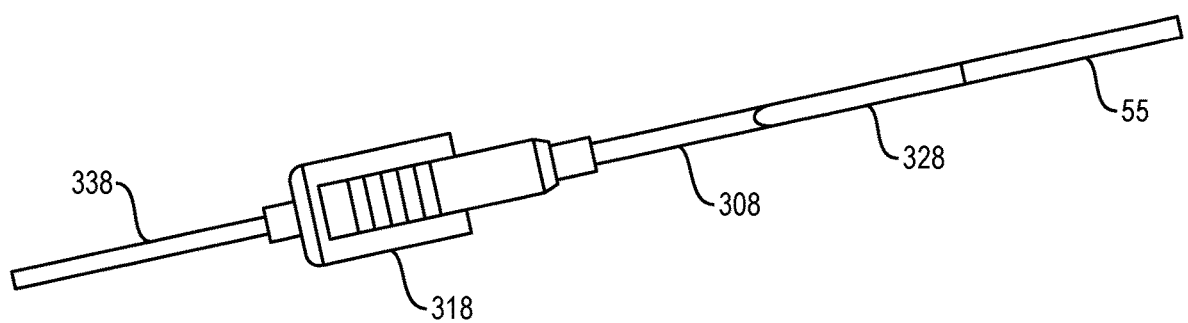
FIG. 6 illustrates the accessory cannula removed from the cannula with the bone dowel shown in the distal portion of the accessory cannula.

Next, remove the accessory cannula 308 with the bone dowel 55 from the cannula 302. As illustrated in FIG. 6, the bone dowel 55 is located in the distal portion 328 of the accessory cannula 308.

The procedure described above and illustrated in FIGS. 3-6 can be repeated if multiple bone dowels are desired.

Figure 7:
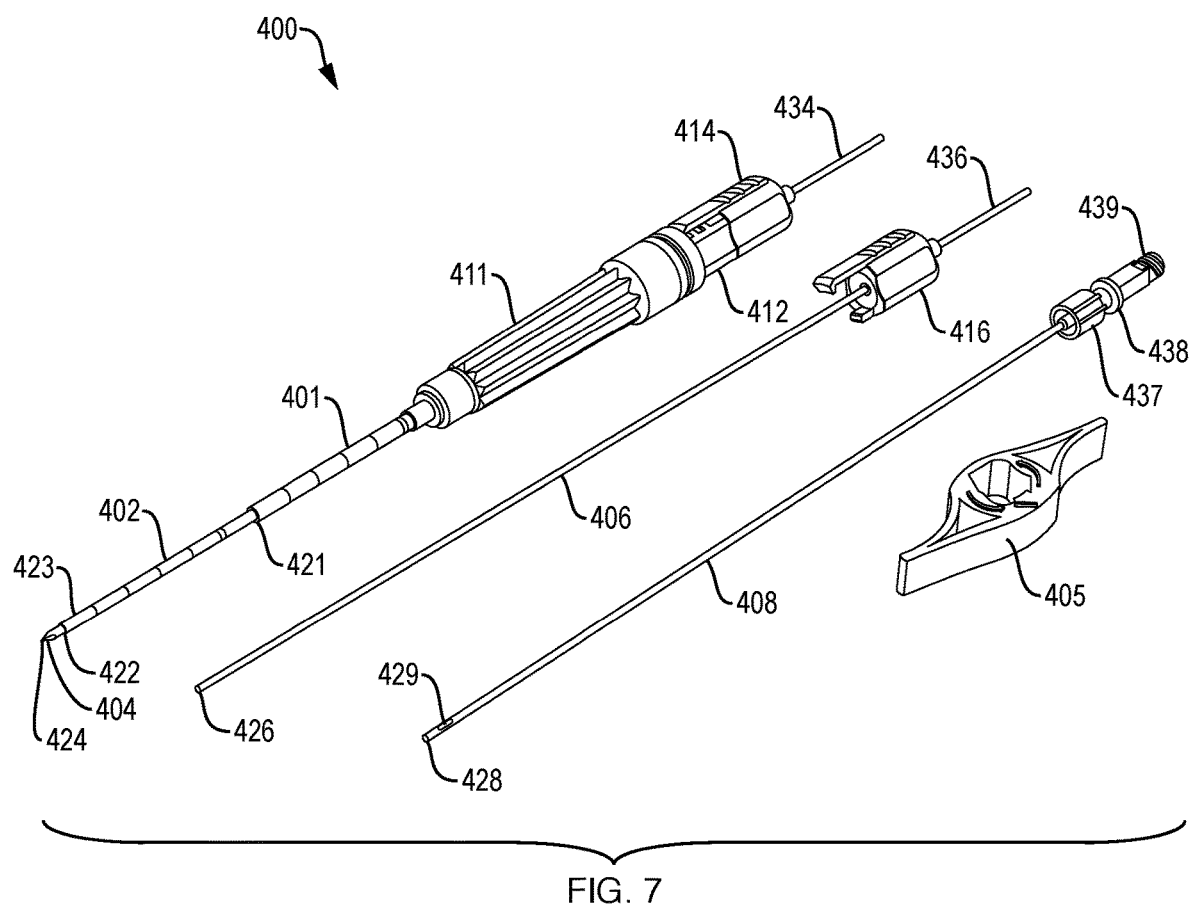
FIG. 7 illustrates a bone marrow aspiration device according to an example embodiment.

FIG. 7 illustrates a bone marrow aspiration device 400 according to an example embodiment. The bone marrow aspiration device 400 includes an outer cannula 401 connected to an outer handle 411 at a proximal end of the outer cannula. A distal end 421 of the outer cannula can be blunt, to enable the distal end to rest against but not penetrate the bone.

A first cannula 402 fits coaxially through the outer cannula 401 and extends beyond the distal end 421 of the outer cannula. For example, the first cannula 402 can extend at least 2 centimeters but less than 8 centimeters beyond the distal end of the outer cannula 401. The first cannula 402 includes at least one side aperture 423 near its distal end 422. The one or more side apertures 423 can be less than 2 centimeters from the distal end of the first cannula. The first cannula 402 is connected to a first handle 412 at a proximal end of the first cannula. The first handle 412 includes a mating feature as further illustrated in FIGS. 8E-8F and described below.

A removable sharp stylet 404 fits coaxially through the first cannula 402. The stylet is connected to a stylet handle 414 that includes a mating feature (see FIGS. 8A-8D) to engage with the mating feature of the first handle 412, to couple the stylet handle to the first handle. In FIG. 7, the stylet handle 414 is shown coupled to the first handle 412. The stylet 404 has a length such that the distal end 424 of the stylet extends beyond the distal end 422 of the first cannula when the stylet handle and first handle are coupled, as illustrated in the figure. The distal end 424 of the stylet and the distal end 422 of first cannula are configured to penetrate bone. The distal ends 422, 424 can be sharp, or include sharp cutting surfaces, or both, to facilitate penetration into the bone. A proximal end of stylet forms an adapter 434 to couple to a drill (not shown), the first cannula 402 and stylet 404 rotating together when driven by the drill coupled to the adapter.

The aspiration device further includes a screw mechanism formed by a lead screw 413 (see, e.g., FIGS. 8E-8H and 9A-9C) extending from the first handle 412 and engaging a threaded portion 403 (see FIG. 9B) of the outer handle 411. The screw mechanism allows the first cannula 402 to be retracted through the outer cannula 401 with rotation of the first handle 412 relative to the outer handle 411. A detachable winged handle 405 is configured to couple to the first handle 412 of the first cannula to assist with rotation of the first handle.

A second cannula 408 fits coaxially through the first cannula 402 once the stylet 404 is removed. A distal end 428 of the second cannula 408 is configured to close off the distal end 422 of the first cannula 402 and leave open the at least one side aperture 423 of the first cannula. A opening 429 is provided in the cannula 408, near the distal end 428, to align with the at least one side aperture 423. The second cannula 408 defines a lumen (see, e.g., FIG. 9B), which communicates with the opening 429, to aspirate bone marrow through the at least one open side aperture 423, the opening 429, and the lumen.

As illustrated in FIG. 7, the second cannula 408 is attached to a handle 438, which can be a luer hub. The handle includes a distal luer connector 437 to connect to a luer connector 465 (see, e.g., FIGS. 8E-8H) at the first cannula in an air-tight manner. The second cannula handle 438 includes a proximal luer connector 439 to enable connection of a syringe in an air-tight manner. The syringe can apply negative pressure to aspirate the bone marrow.

In the example illustrated in FIG. 7, the outer cannula 401 is 8 gauge, the first cannula 402, which fits through the outer cannula, is 11 gauge, and the second cannula 408, which fits through the first cannula, is 14 gauge.

The aspiration device 400 further includes a removable blunt stylet 406 that fits coaxially through the first cannula 402 once the sharp stylet 404 is removed. The blunt stylet is connected to a blunt stylet handle 416 that includes a mating feature to engage with the mating feature of the first handle, to couple the stylet handle to the first handle. The blunt stylet 406 has a length such that a distal end 426 of the stylet extends beyond the distal end 422 of the first cannula when the stylet handle and first handle are coupled. The blunt stylet 406 can be used to advance the cannula 402 into bone marrow, prior to inserting the second cannula 408. A proximal end 436 of the stylet 406 forms an adapter to couple to a drill.

As further illustrated in FIGS. 8A-8H, the mating feature of the first handle 412 can include a keyway, such keyway can include a central recess and adjacent ridges. The mating feature of the stylet handle 414 can include a key. Such key can include a finger receivable in the central recess with a linear motion of the finger, the finger including a slot to engage one of the ridges of the keyway with a rotational motion of the finger.

FIS. 8A, 8B, 8C, and 8D are top, side, bottom, and perspective views, respectively, of the stylet handle 414 of the device 400 of FIG. 7. FIGS. 8E, 8F, 8G, and 8H are top, side, bottom, and perspective views, respectively, of the cannula handle 412, including attached lead screw 413, of the device of FIG. 7.

Referring to FIGS. 8A-8D, the proximal end 434 of the stylet 404 extends through a stylet handle 414 that is connected to the stylet. The proximal end 434 forms a post that protrudes from the stylet handle and that is shaped and sized to fit a drill. The stylet handle 414 and cannula handle 412 (FIG. 8E) are configured to mate such that the stylet and stylet handle can rotate independently of the cannula and cannula handle in clockwise and counter clockwise directions for a limited amount of rotation before both the cannula handle and connected cannula and the stylet handle and connected stylet rotate together. Such limited amount of rotation can be less than 360 degrees, and preferably is less than 90 degrees, and more preferably less than 45 degrees.

Figure 8A:
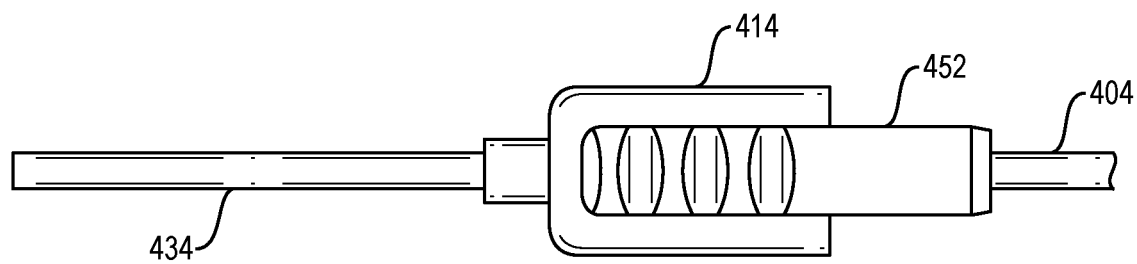
FIGS. 8A, 8B, 8C, and 8D are top, side, bottom, and perspective views, respectively, of the stylet handle of the device of FIG. 7.
Figure 8B:
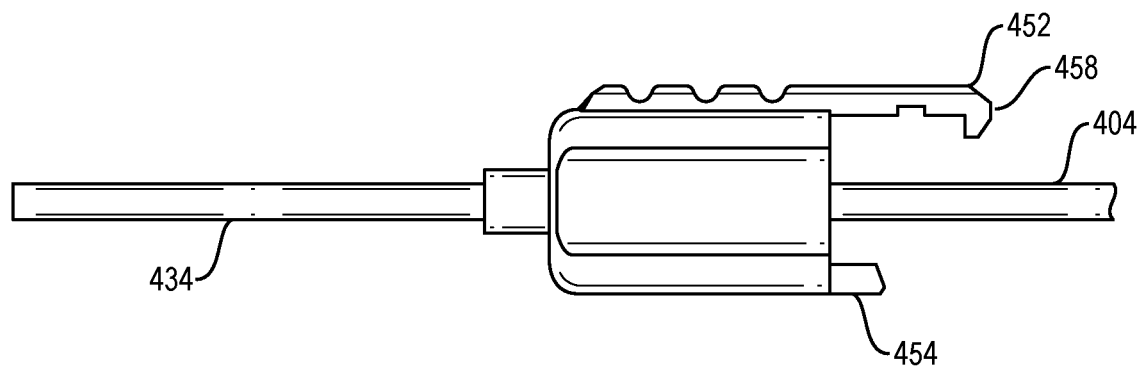
Figure 8C:
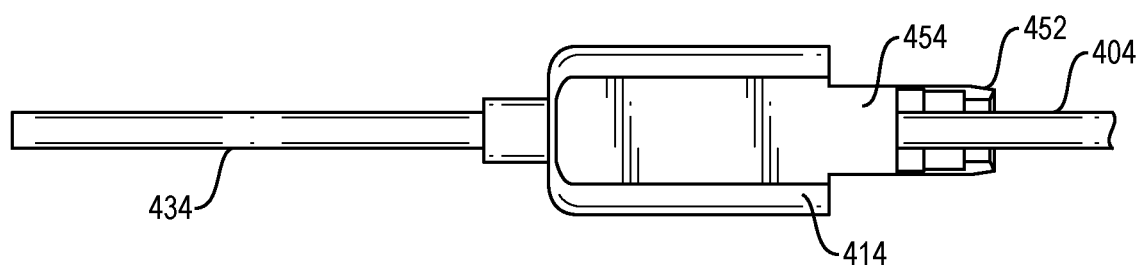
Figure 8D:
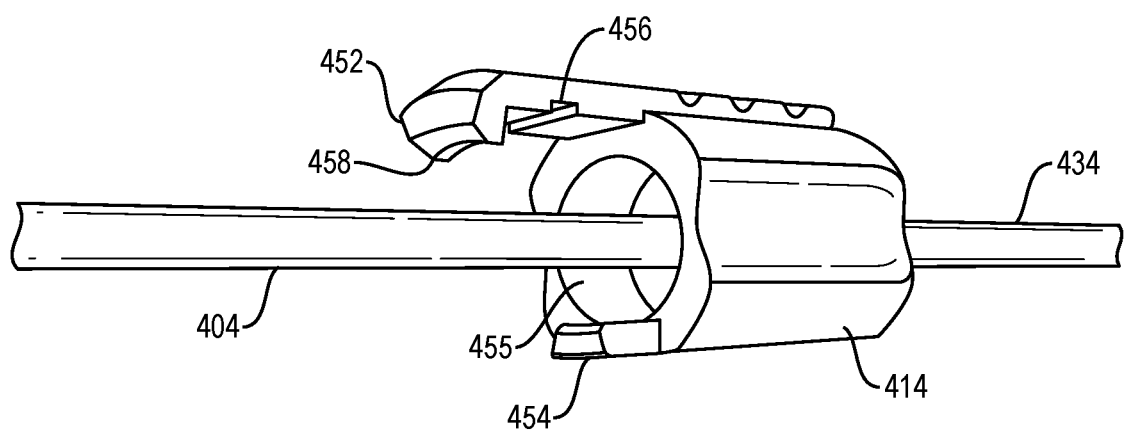
Figure 8E:
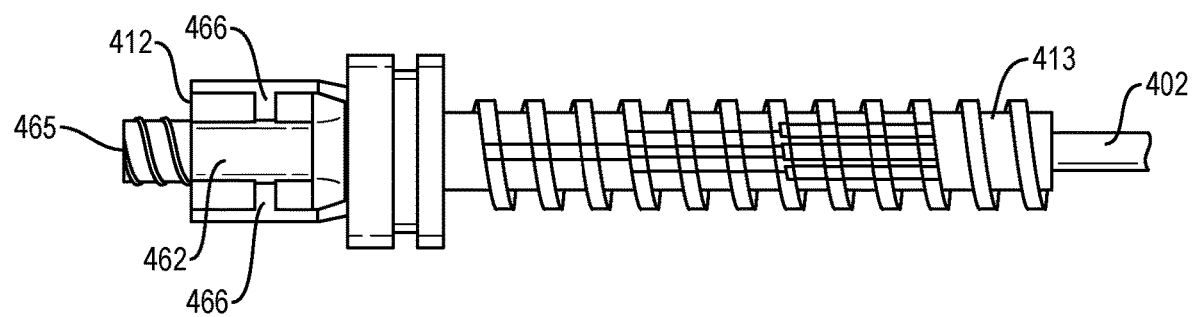
FIGS. 8E, 8F, 8G, and 8H are top, side, bottom, and perspective views, respectively, of the first (inner) cannula handle, including attached lead screw, of the device of FIG. 7.
Figure 8F:
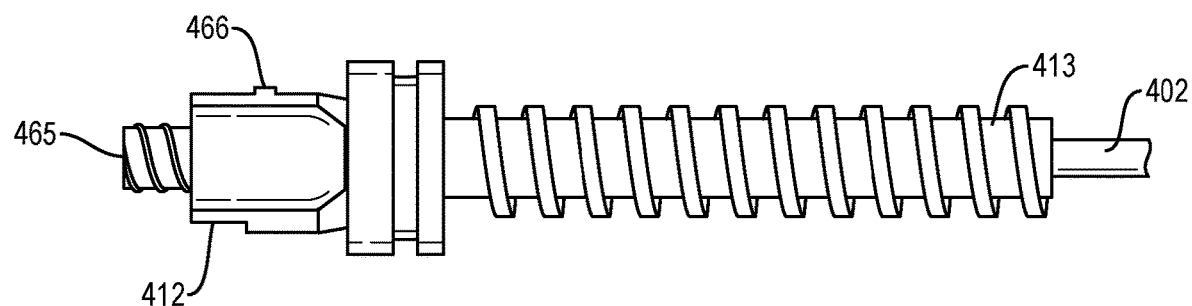
Figure 8G:
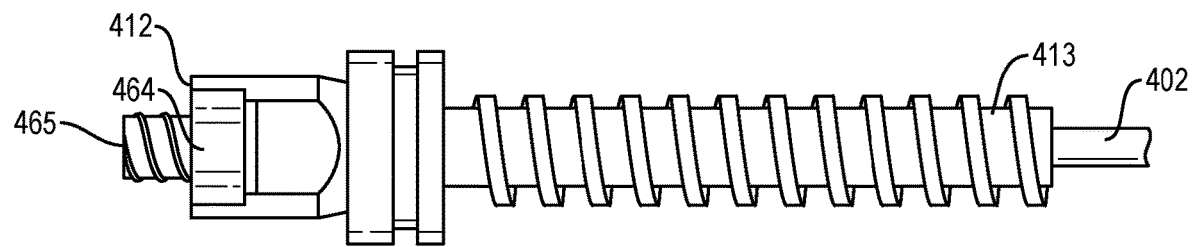
Figure 8H:
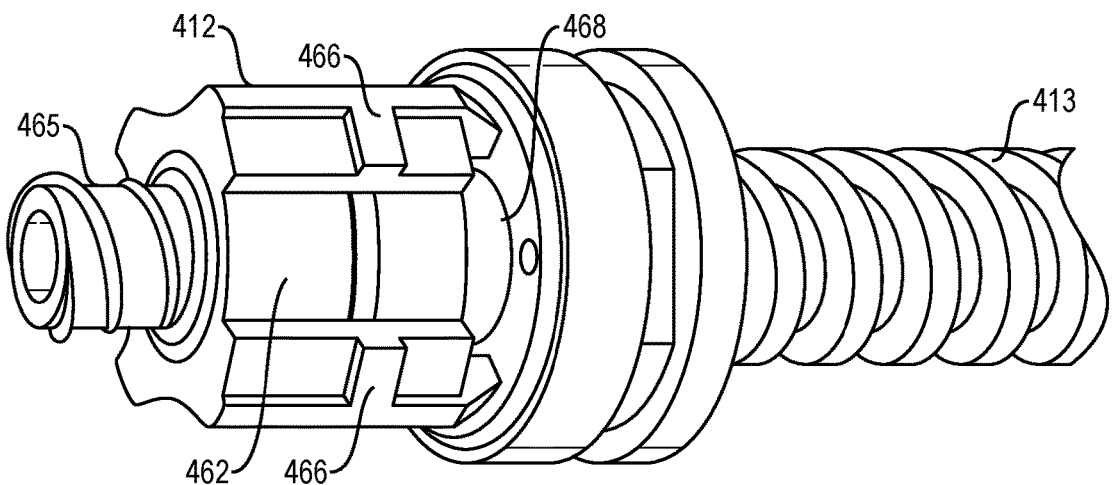

To mate the stylet handle 414 to the cannula handle 412, the cannula handle defines a keyway and the stylet handle defines a key receivable in the keyway. The keyway of the cannula handle 412 includes a first keyway 462 on one side of the cannula handle, as illustrated in FIGS. 8E and 8H, and a second keyway 464 on an opposite side of the cannula handle 412, as illustrated in FIG. 8G. The key of the stylet handle 414 includes a first key 452 receivable in the first keyway 462 and a second key 454 receivable in the second keyway 464.

As illustrated in the examples of FIGS. 8E and 8G, the first and second keyways 462, 464 include respective first and second recesses in the cannula handle 412. As illustrated in FIGS. 8A and 8C, the first and second keys 452, 454, are respective first and second fingers extending from the stylet handle 414, the first finger being longer than the second finger. The first and second recesses can each be defined by two sidewalls connected by a convex surface, as best seen in FIGS. 8G and 8H. The first and second fingers 452, 454 can each define a concave surface, complimentary to the convex surface, as best seen in FIG. 8D. The first finger 452 of the stylet handle 414 includes a lip 458 formed at an end of the first finger and a slot 456 formed along a length of the first finger. The first keyway 462 of the cannula handle 412 includes at least two ridges 466 adjacent a central recess (FIGS. 8E, 8F, 8H). The lip 458 of the first finger is receivable in the central recess with linear motion of the finger, and, when fully received, the lip 458 can snap into place at a recess 468 adjacent the central recess of keyway 462. The slot 456 of the finger is configured to engage with one of the ridges 466 with rotation of the finger. The recess 468 allows for rotation of the finger 452.

As illustrated in FIGS. 8A-8D, the cannula handle 412 includes a luer connector 465, and, as illustrated in FIG. 8D, the stylet handle 424 include a recess 455, to receive the luer connector 465.

FIGS. 9A and 9B are side and section views of the device 400 of FIG. 7 illustrating the second (aspiration) cannula 408 inserted through the first (inner) cannula 402 and outer cannula 401 after removal of the stylet(s). The luer connector 437 at handle 438 is connected to the luer connector 465 of cannula 402. The closed, distal end 428 of the second cannula extends beyond the distal end 422 of the first cannula, closing off the distal end 422 and leaving open the at least one side aperture 423. As can be seen in FIG. 9B, the opening 429 in the side wall of the second cannula is aligned with the at least one side aperture 423. The lead screw 413 is shown extending from the handle 412 of cannula 402, the lead screw engaging the threaded portion 403 of the outer handle 411. The lead screw 413 and threaded portion 403 form a screw mechanism, as further described herein. The winged handle 405 is coupled to the handle 412.

Figure 9C:
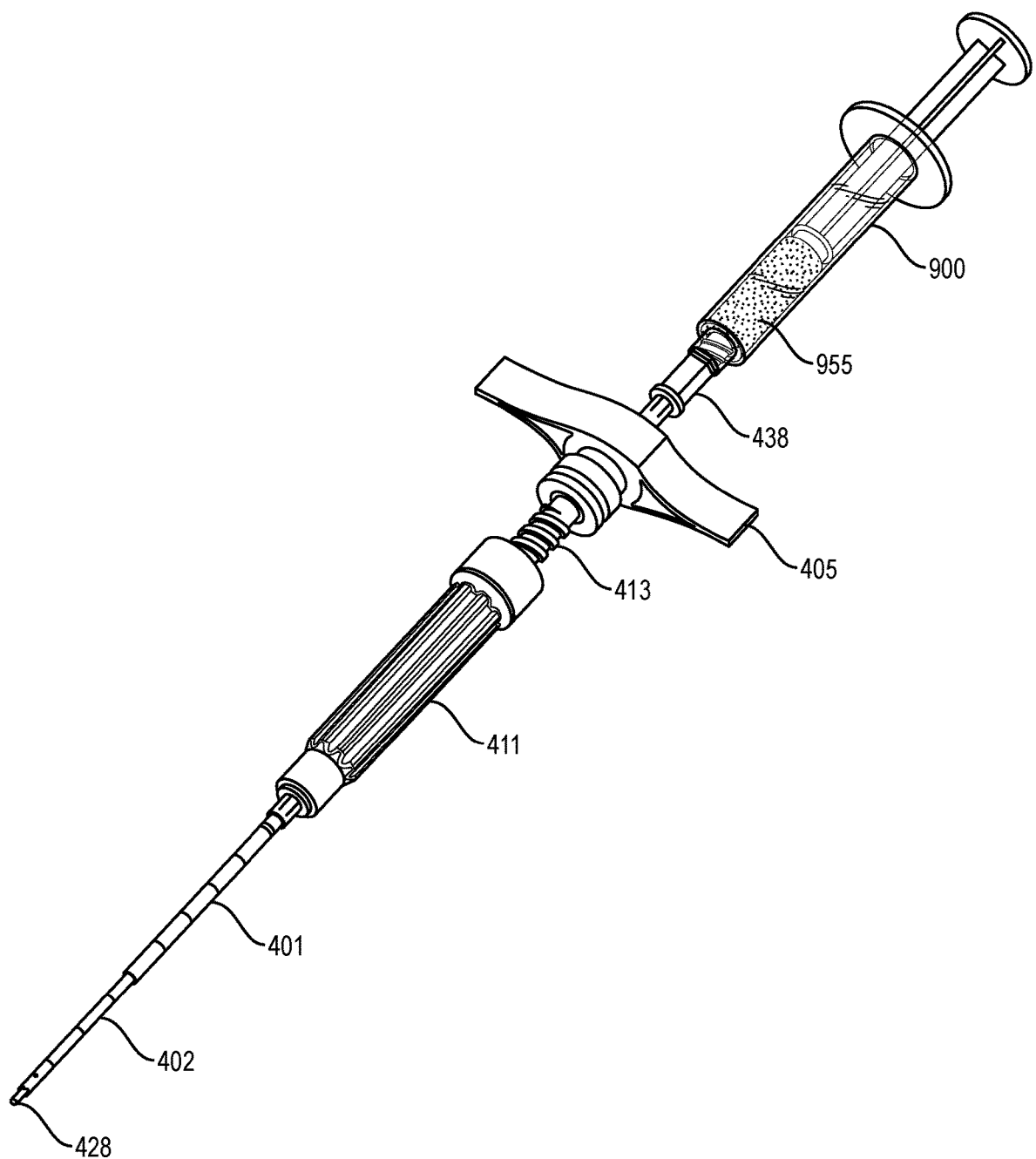
FIG. 9C is a perspective view of the device of FIG. 9A illustrating a syringe connected to the aspiration cannula.

FIG. 9C is a perspective view of the device of FIG. 9A illustrating a syringe 900 connected to the luer connector 439 at the handle 438 of the aspiration cannula 408. Also illustrated is bone marrow aspirate 955 in the syringe 900.

FIGS. 10-12B illustrate a method for harvesting bone marrow from the iliac crest using the aspiration device 400 of FIG. 7.

Figure 10:
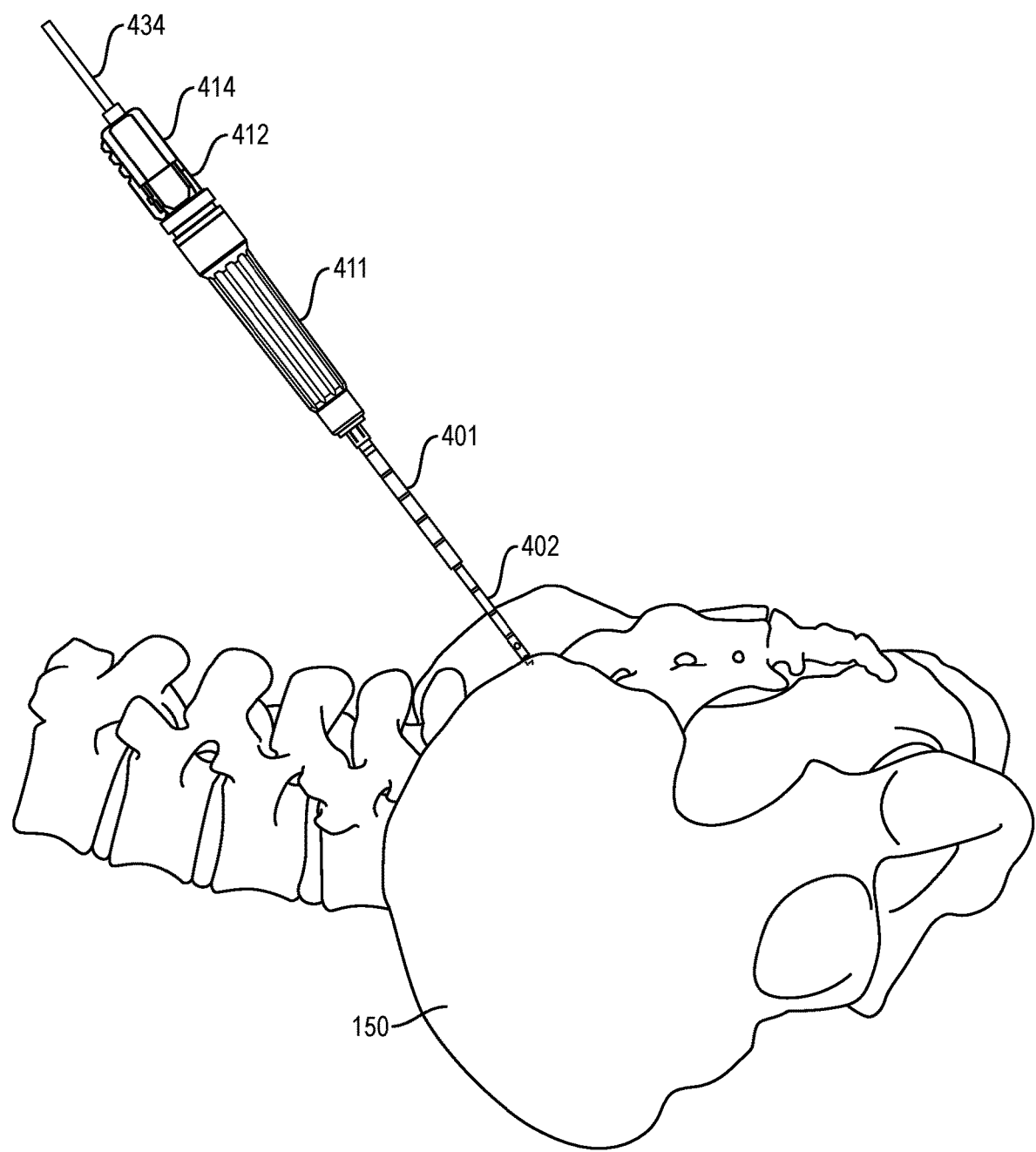
FIG. 10 illustrates iliac crest bone marrow harvesting using the aspiration device of FIG. 7. Shown is the device including outer cannula, inner cannula, and sharp stylet located adjacent to the biopsy site.

As illustrated in FIG. 10, following proper placement technique, locate the needle including cannula 402 and stylet 404 (inside cannula 402) adjacent to the biopsy site at bone 150. Using a surgical drill (not shown) with appropriate attachments to couple to the adapter 434 of the stylet handle 414, drill clockwise to advance the needle. Entrance into the marrow cavity is generally detected by decreased resistance.

Figure 11:
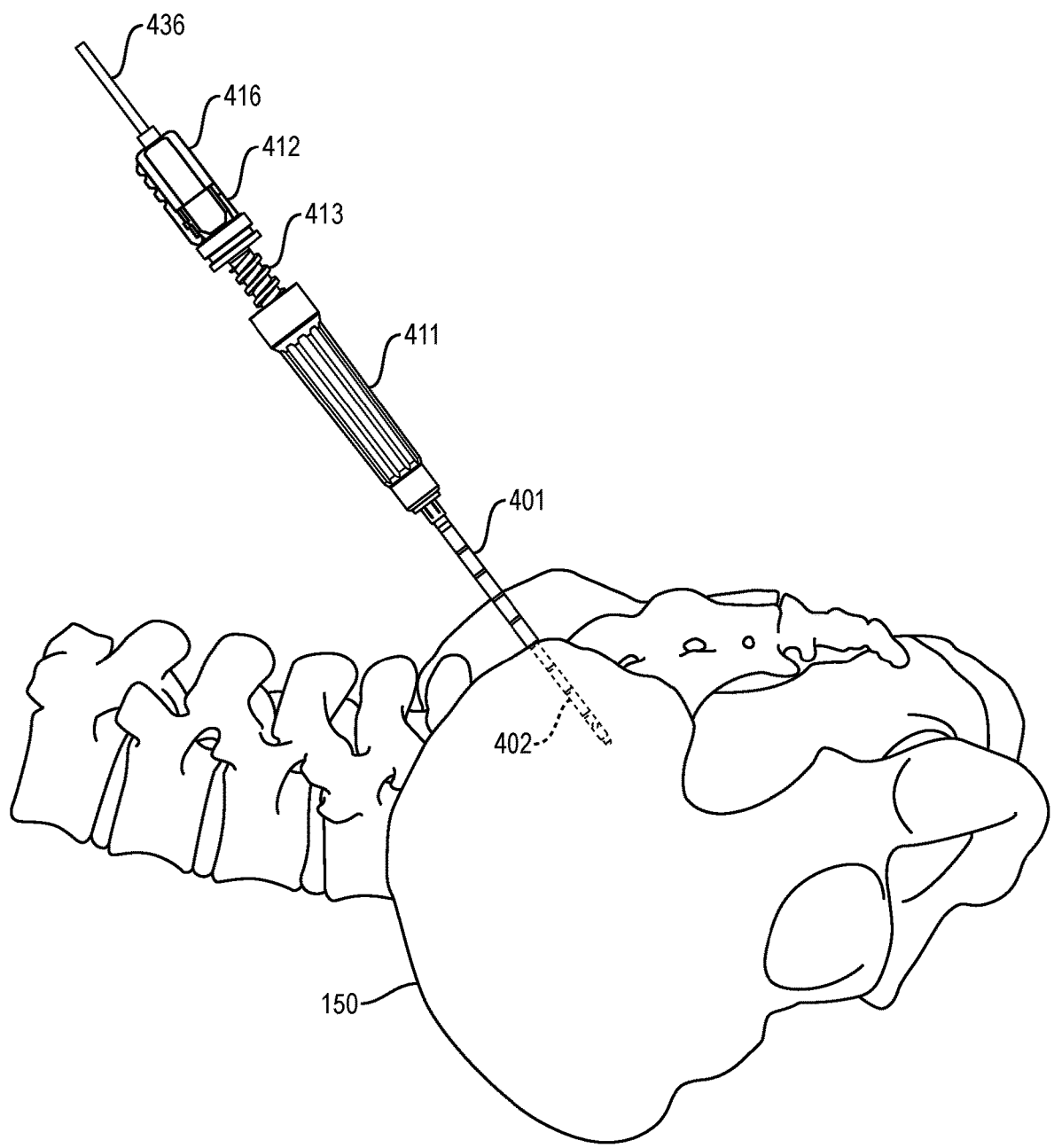
FIG. 11 illustrates the device of FIG. 10 with a blunt stylet inserted after the sharp stylet has been removed. The inner cannula of device has been advanced further into bone and the outer cannula advanced against the bone by turning the outer handle relative to the handle of the inner cannula.

Next, unlock the stylet handle 414 by rotating it to the center position relative to the cannula handle 412, and remove the stylet 404 from the cannula 402. Install the blunt stylet 406 into the cannula 402, coupling the blunt stylet handle 416 to cannula handle 412, as illustrated in FIG. 11. Couple a drill to adapter 436 of the blunt stylet to power the device. Advance the needle by drilling clockwise until a depth of 3-5 cm is achieved or an increased resistance can be felt.

Advance the molded grip (e.g., outer handle) 411 and attached outer cannula 401 by turning it clockwise while holding the needle handle 412 until slight resistance can be felt. The outer cannula 401 is positioned against the bone 150, and the lead screw 413 is visible, as illustrated in FIG. 11.

Figure 12A:
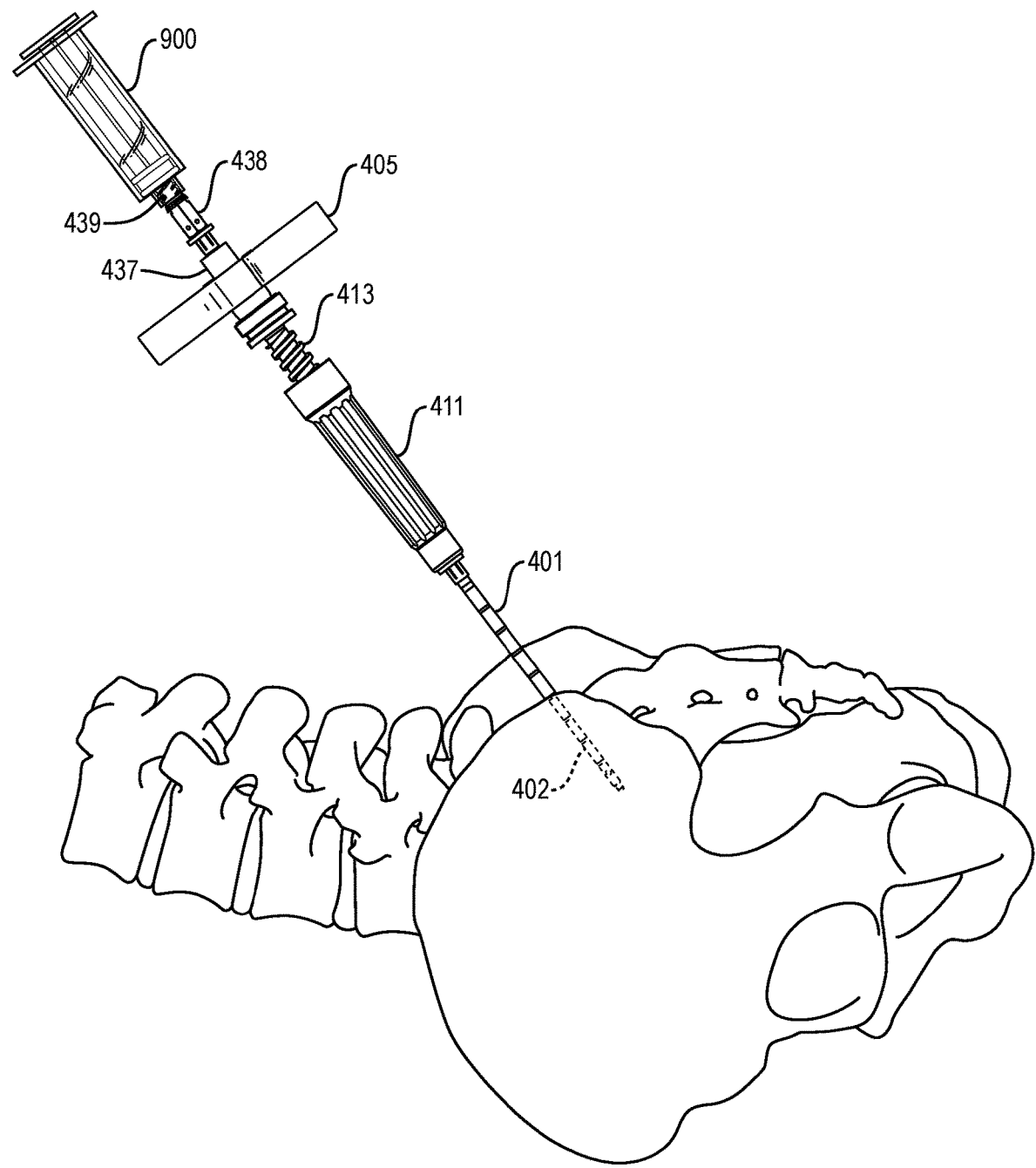
FIG. 12A illustrates the device of FIG. 11 after the blunt stylet has been removed. The winged handle is attached to the cannula handle and the aspiration cannula is inserted through the cannula and secured in place by the luer connection. Also shown is a syringe attached to the aspiration cannula using another luer connection.
Figure 12B:
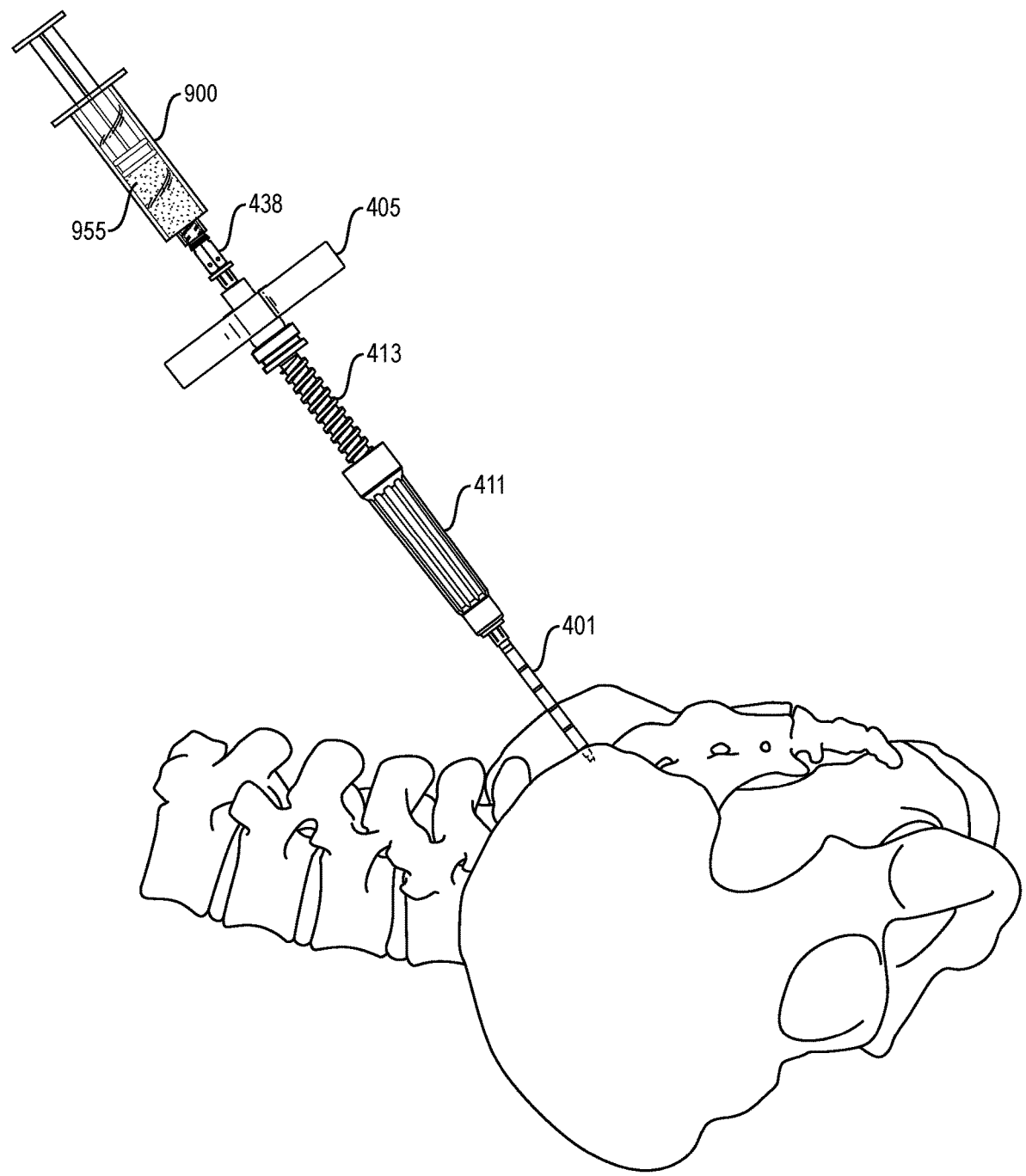
FIG. 12B illustrates aspiration of bone marrow by applying negative pressure caused by withdrawing the syringe plunger.

Next, unlock the blunt stylet handle 416 by rotating it to the center position and remove the blunt stylet 406 from the cannula 402. Install the slip fit, winged handle 405 by aligning an indicator arrow on the handle with a slotted face of the cannula handle 412. Insert the aspiration cannula 408 through the handle 412 and cannula 402 and secure it in place by the luer connection 437 of handle 438. Attach a syringe 900 to the aspiration cannula 408 using the lure connection 439, as illustrated in FIG. 12A To begin aspiration of bone marrow, apply negative pressure by quickly withdrawing the syringe plunger. Hold the molded grip 411 in one hand and with the other hand turn the winged handle 405 one full revolution (360 degrees) to activate the screw mechanism causing relative motion of the lead screw 413 and the threaded portion of the grip 411. This lifts the aspiration cannula 408 and cannula 402 out of the bone to a new aspiration site, as illustrated in FIG. 12B. Preferably, this is done after each 1-2 cc draw of aspirate, to avoid excess dilution of peripheral blood. Repeat the aspiration process until desired volume is obtained or the cannula is out of the bone space.

Figure 13:
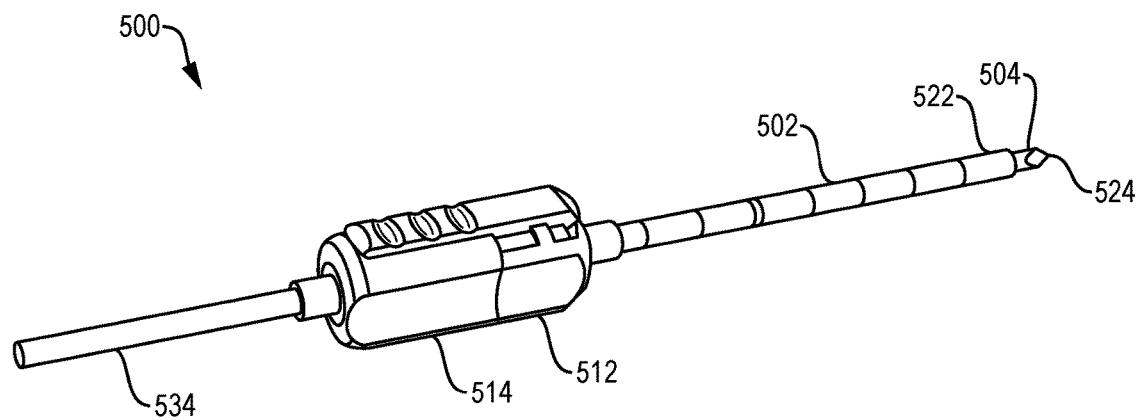
FIG. 13 illustrates a bone access device including a cannula and a stylet according to an example embodiment.

FIG. 13 illustrates a bone access device 500 according to an example embodiment.

The bone access device 500 that includes an open tip cannula 502, e.g., an 8-gauge cannula, and is designed to be powered by a drill. The device includes a sharp stylet 504 receivable in the lumen of cannula 502. A style handle 514 is attached the stylet 504. The handle 514 is configured to couple to handle 512 of the cannula 502. When the handles are coupled, a distal end 524 of the stylet extends beyond a distal end 522 of the cannula 502. The handles 512 and 514 have complimentary mating features, just like the handles 412 and 414 described above with regard to FIGS. 8A-8H. A proximal end 534 of the stylet 504 can extend through the handle 514, to form an adapter for connecting a standard surgical drill.

The device 500 can serve as an access port to ream, transplant, or remove tissue. For example, the dowel capture spoons from the bone capture devices 100 and 200 (FIGS. 1 and 2) can be used with the device 500 to transplant bone dowels. The harvesting cannula of the device 200, for example, can be 3 cm longer than the cannula 502 and can be used in tandem with the device 500 to remove necrotic bone. Removing necrotic bone and transplanting autologous healthy bone is the gold standard of orthopedic bone repair. The access channel provided by device 502 can also be used to transplant graft material granules. Combining marrow aspirate with autogenous bone and a graft extender allows clinicians to fill boney defects using the patient's own cells and scaffold as the engine for bone healing.

Figure 14:
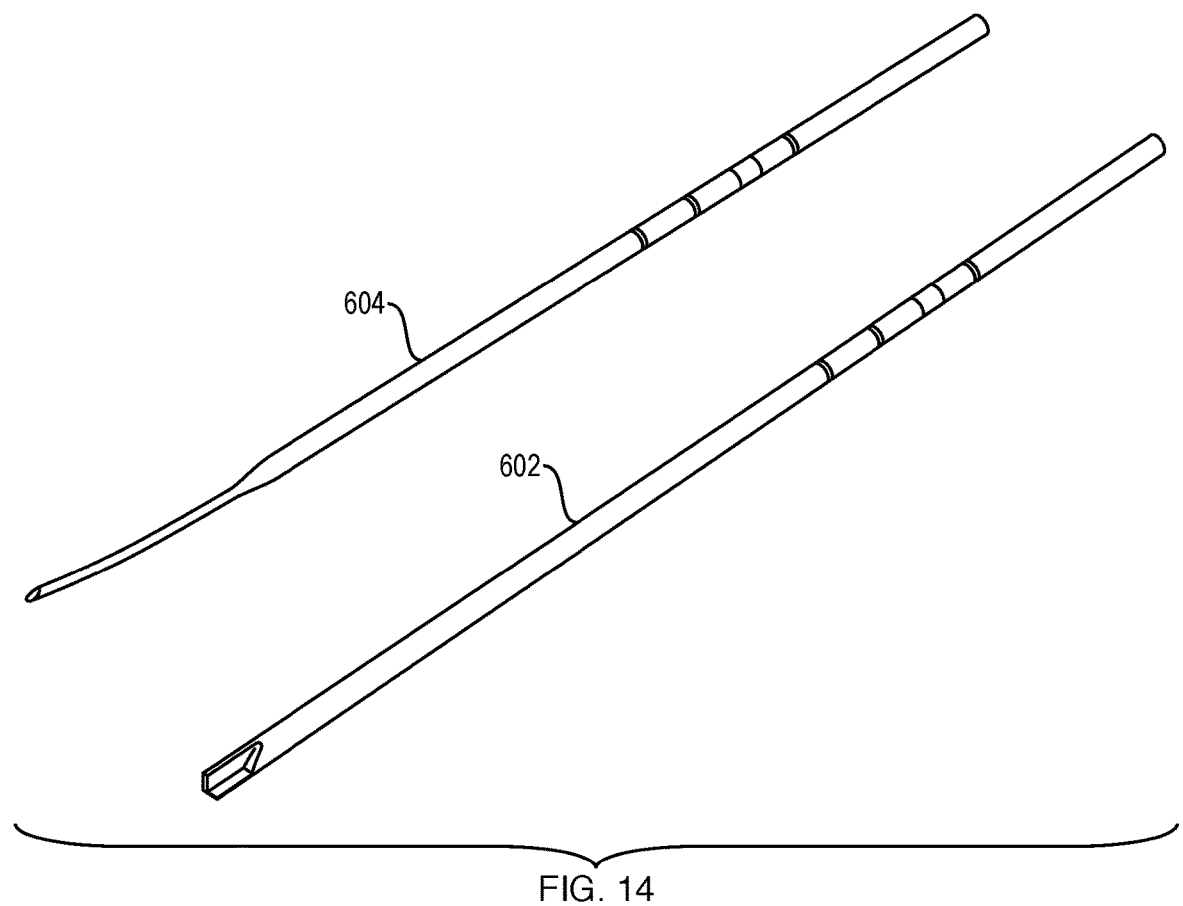
FIG. 14 illustrates a kit including a reamer and curette for use with embodiments of the invention, such as the bone access device of FIG. 13.

FIG. 14 illustrates a kit of tools designed for use with the bone access device 500 of FIG. 13. The kit includes a straight reamer 602 and curved curette 604 for delivery site preparation prior to delivery of an orthobiologic, e.g. delivery of a bone dowel, a bone marrow aspirate, or combination thereof, to a bone lesion. In the example illustrated, each tool is an 8-gauge device that extends 3 cm beyond the distal end of the access & injection cannula 502. The reamer increases the length of space available for orthobiologic delivery within the medullary canal while the curette 604 provides the extra ability to increase the width of the available space, e.g., to allow injection of bone marrow.

FIGS. 15-22 illustrate insertion of a bone access cannula into the sub-chondral space of a bone to treat a lesion.

Figure 15:
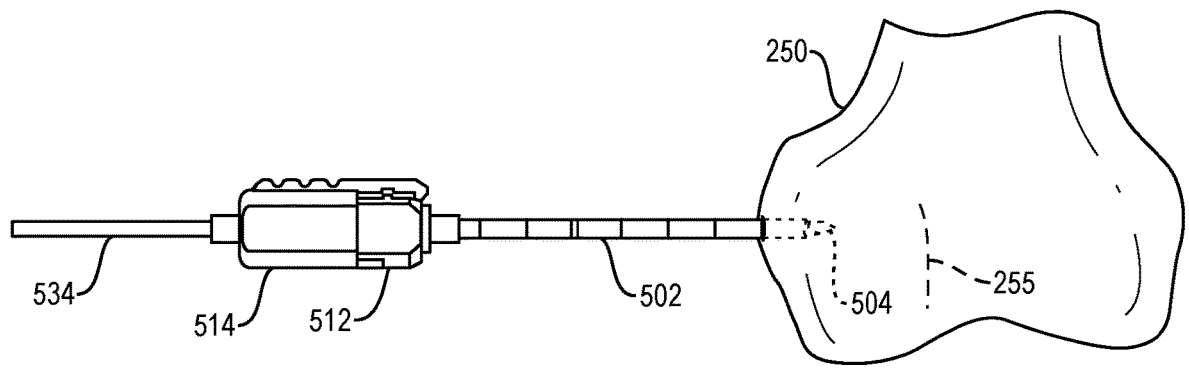
FIG. 15 illustrates insertion of the access cannula into the sub-chondral space of bone until the tip is adjacent to an identified lesion.

As illustrated in FIG. 15, insert access cannula 502 including stylet 504 of device 500 into the sub-chondral space of a bone 250 until the tip of the stylet 504 is adjacent to the identified lesion 255.

Figure 16:
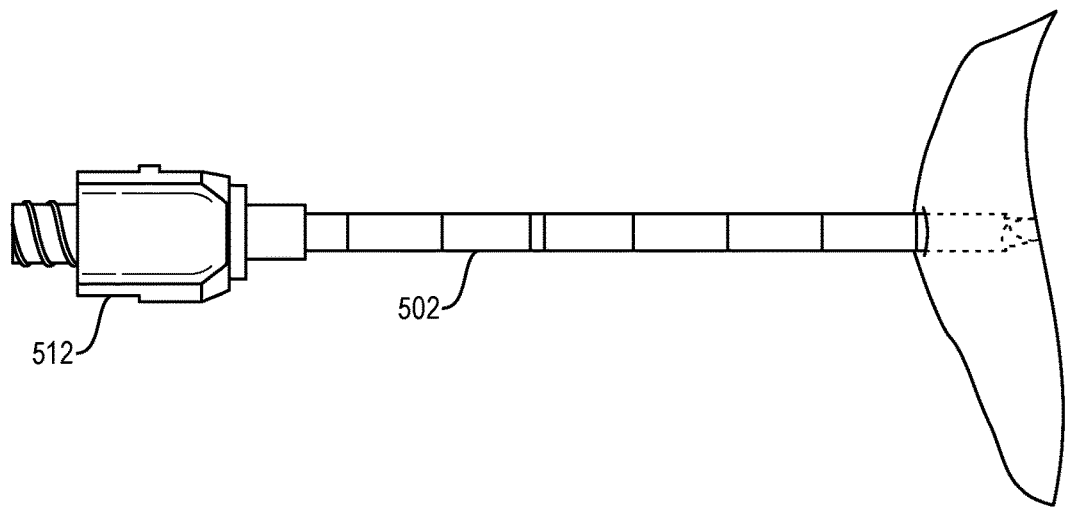
FIG. 16 illustrates the device of FIG. 15 after removal of the stylet leaving the cannula as a working channel to access bone.

Next, remove stylet 504 leaving the cannula as a working channel, as illustrated in FIG. 16.

Figure 17:
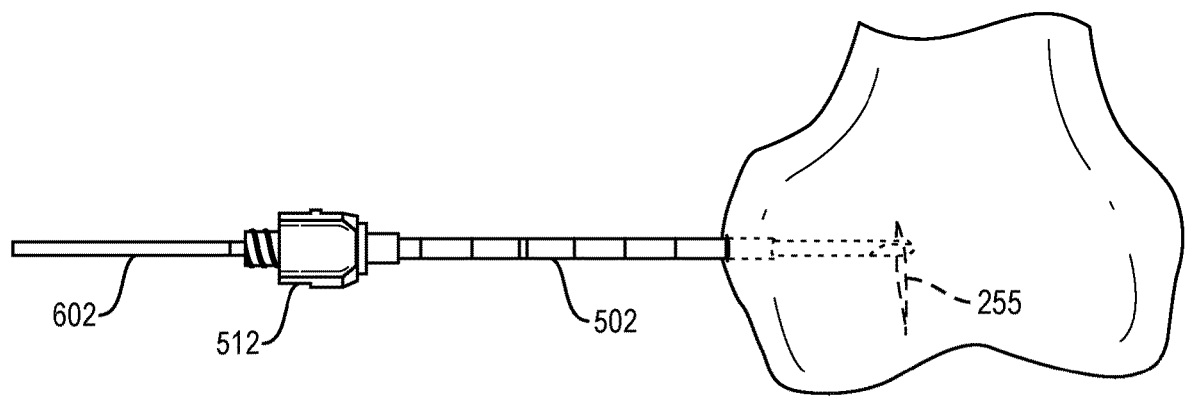
FIG. 17 illustrates insertion of a straight reamer through the cannula of FIG. 16 to disrupt the lesion in the bone.

As illustrated in FIG. 17, insert a straight reamer 602 through the cannula 502 and beyond the distal end of the cannula. Disrupt the lesion by rotating the reamer 602.

Figure 18:
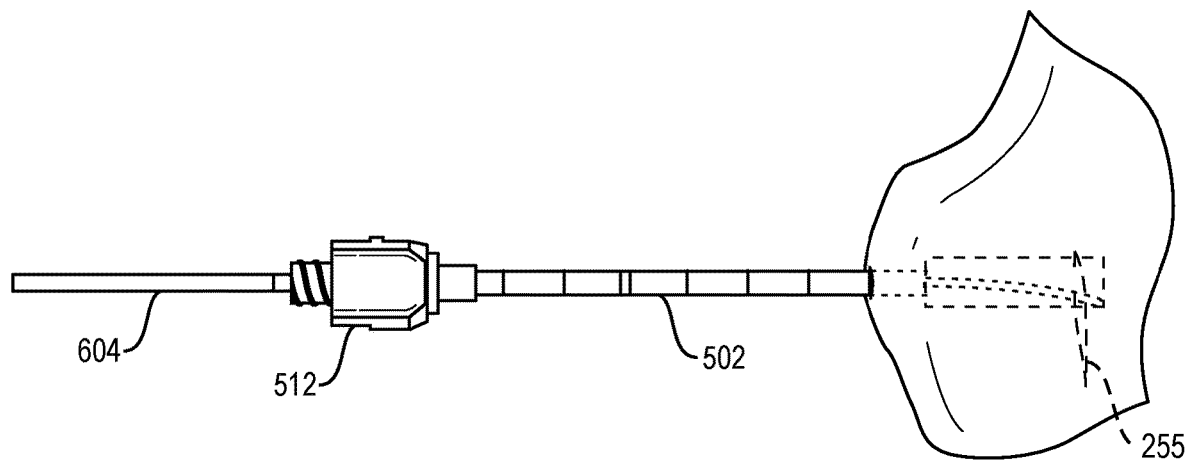
FIG. 18 illustrates insertion of a curved curette through the cannula of FIG. 16, e.g., after removal of the reamer of FIG. 17, to disrupt the lesion.

Next, remove the reamer 602 and insert a curved curette 604 through the cannula 502 and disrupt the lesion by rotating the curette, as illustrated in FIG. 18. The curved curette makes a path that is greater than the diameter of the cannula.

Figure 19:
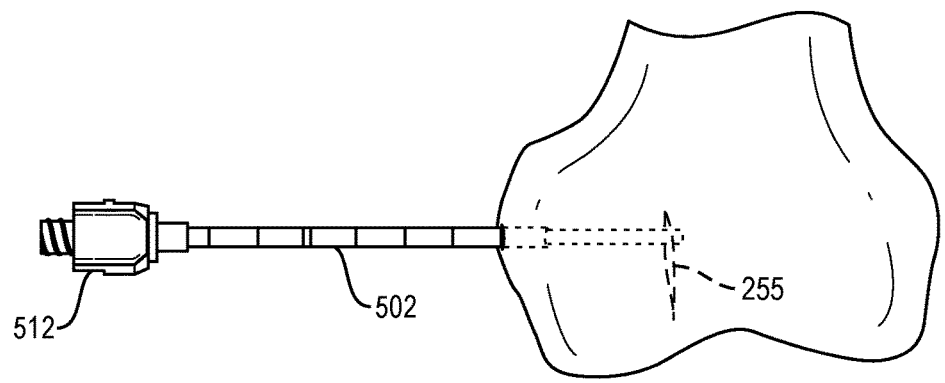
FIG. 19 illustrates the cannula of FIG. 18 after the curved curette has been removed.
Figure 20:
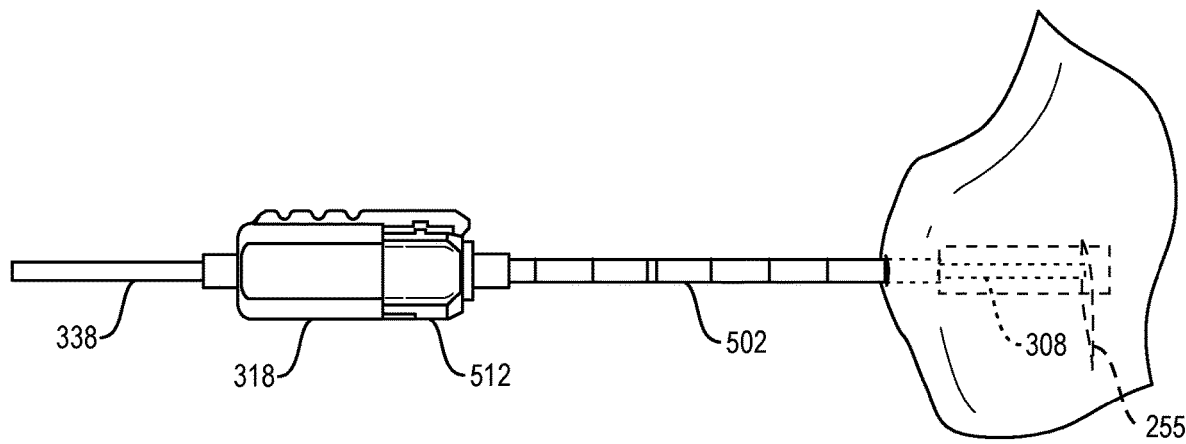
FIG. 20 illustrates a spoon cannula containing a bone dowel being inserted through the cannula and into the lesion.

FIG. 19 illustrates the cannula 502 with the curved curette removed. Next, insert spoon cannula 308 containing a bone dowel through the cannula. FIG. 20 illustrates the spoon cannula containing the dowel assembled through the cannula, the handle 318 of the cannula 308 coupled to the handle 512 of cannula 502.

Figure 21:
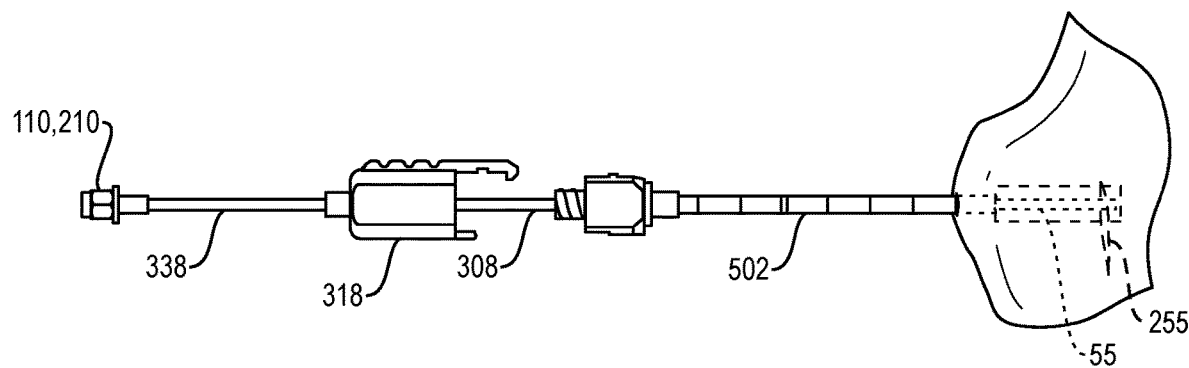
FIG. 21 illustrates using a push rod to advance the bone dowel into the prepared site of the lesion as the spoon cannula is pulled away from the working channel of the cannula.

As illustrated in FIG. 21, use a push rod, such as push rods 110, 210, to advance the bone dowel 55 into the prepared site as the inner, spoon cannula 308 is pulled away from the working channel of cannula 502.

Figure 22:
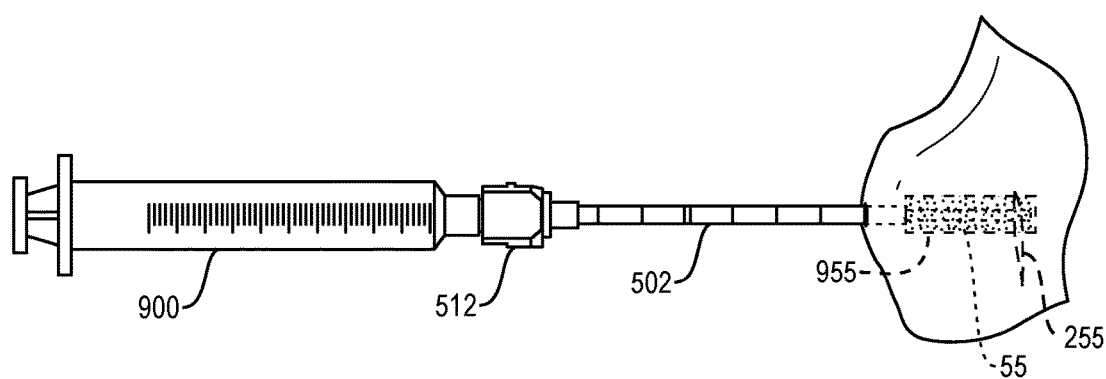
FIG. 22 illustrates injecting bone marrow aspirate (BMA) into the prepared site after the spoon cannula has been removed.

Optionally, as illustrated in FIG. 22, couple a syringe 900 to the luer connector of the handle 512 and inject bone marrow aspirate (BMA) 955 from the syringe through the cannula 502 into the prepared site. See FIGS. 10-12 and associate description for a process to use the device 700 to obtain the BMA from the iliac crest.

Further details and examples of embodiments of the invention are be described in the following paragraphs.

Example Tools to Take a Solid Bone Core Sample:

A four-part device includes a first cannula with a handle, up to three additional interchangeable handles with K-wire or tube adapters on the proximal end of the handles. One interchangeable handle can be attached to a sharp stylet that, when assembled into the first cannula handle, extends beyond the distal end of the first cannula. One interchangeable handle can have a short stylet that, when assembled into the first cannula, leaves most of the distal end of the first cannula open or this interchangeable handle can have no stylet at all; it can be just an interchangeable handle with a K-wire or post adapter on the proximal end. Another interchangeable handle is attached to a cannula with a spoon cut out (i.e., a cannula having half of the cannula wall removed, also referred to as a spoon cannula) on the distal end. This interchangeable handle can have a tube adapter on the proximal end to attach to the drill. When the interchangeable handle is assembled into the first cannula handle, the spoon cannula attached to the interchangeable handle extends approximately to the end of the first cannula but not substantially beyond. Preferably, the two cannulas are flush at the end, or the distal end of the cannula attached to the interchangeable cannula is long enough that is interfaces with the dowel to allow the dowel to remain captured in the cannula (e.g., no less that 5 mm from the distal end of the first cannula and not substantially beyond the length of the first cannula).

When advancing the hollow cannula to capture a sample of bone, a portion of the distal end of the cannula is unobstructed (open) in order for the cannula to fill up with the sample. During this part of the procedure, the other end of the cannula will have a handle, the cannula handle will mate with a second handle, the second handle will have a feature proximal (post or wire) that allows the two handles and cannula to move together. A feature of the second handle when assembled to the cannula handle during this sample capture step will cause the inner diameter of the cannula at its widest point to be greater than the inner diameter of the fluid path distal to this widest point when the two handles are assembled. This is illustrated, for example, in FIG. 4. The blunt stylet and handle narrows the fluid path to zero, and the distal end of the cannula is open. A post with a center hole can also be used. This would narrow the path but would not close it off completely. Both post and wire adapters are shown in the Figures described above, e.g. FIGS. 1-6.

Example Cannula with a Handle:

An example device includes a cannula with a handle attached to a proximal end of the cannula. The handle has a luer fitting. The distal end of the cannula has a tapered end, often referred to as a swage tip. The inner diameter of the cannula at the distal tip is narrower than at more proximal portions of the cannula. This tapered tip is a standard in bone marrow biopsy devices, often referred to as a swage. The handle has a mating feature that is a keyway that goes partially around the handle. The center of the keyway is without ridges.

Example Device Having Two Handles, at Least One Handle Attached to a Sharp Stylet:

At least two handles that also have a K-wire protruding from the proximal end. The handle attached to the stylet fits into the handle of the cannula through a keyway. The handle of the stylet has a finger that has a width that is less than the width of the keyway in the cannula handle. The finger of the stylet handle has underneath ridges that mates with corresponding ridges on keyway section on the handle of the cannula. When the center keyway of the cannula that does not have ridges and the finger of the stylet handle are aligned, the stylet mates with the cannula handle. Since there is no interference fit in the center of the cannula handle keyway, the stylet can be inserted and removed from the cannula by lining up the finger of the stylet handle with the center of the keyway in the handle. On either side of the keyway in the cannula handle are ridges. The sidewall of the keyway is solid material. Turning the K-wire or handle of the stylet when it is assembled into the handle of the cannula, clockwise or counterclockwise, causes the stylet to turn independent of the cannula for a short distance before the handle of the stylet hits the interference of the side wall of the keyway in the handle of the cannula causing both stylet and handle to turn together. The interference fit of the ridges when the finger of the stylet handle is against the sidewall of the cannula handle keyway, allows the stylet and cannula to be lifted together. They (cannula and stylet) only separate and assemble when the finger of the stylet handle is in the center of the keyway where there are no ridges. The K-wire and posts used in the devices described can be constructed to be able to withstand the force applied by a mallet, for situations where a drill is not used.

The first K-wire handle can be attached to a stylet that has a sharp distal tip to penetrate cortical bone. The second K-wire handle can be attached to a stylet that is shorter than the sharp stylet, or the handle can be without a stylet. In either embodiment, the second K-wire adapter handle leaves a large section of the cannula unoccupied.

The current solution presents several useful and advantageous features. For example, open tipped cannulated drill devices typically do not have a swage tip or a removeable solid tipped stylet that can be removed after penetrating cortical bone or a third cannula to break the dowel off inside the cannula. Swage tipped cannulas typically are advanced through trabecular bone with the full length of the lumen completely open, whether advanced by power or manually. Bone samples are captured in the hollow cannula. It is counter intuitive to close any portion of the swage tip needle because the distal end of the cannula needs to be open to capture the sample. It is counter intuitive to adapt the swage needle cannula and handle assembly through a series of K-wire adapters and handles, where the K-wire adapters engage an operating room standard drill. Bone sample procedures are typically done manually or with a non-sterile drill. The tissue obtained from such standard biopsy needle devices are typically not transplanted in the same patient and same procedure. These types of needles are not typically used by orthopedic surgeons to access and transplant bone.

In contrast, embodiments disclosed herein use one K-wire adapter and handle is attached to a sharp stylet that affords the ability to penetrate cortical bone and the other K-wire adapter and handle is attached to the handle of the cannula, closing off the top of the cannula but leaving open the distal tip to capture the bone core. The second K-wire handle closes the open cannula on the proximal end but leaves the bottom distal swage end open in order to capture bone as the cannula is advanced through trabecular bone. Once the cannula is advanced with the second K-wire adapter, bone fills the inside of the cannula but is still connected to the body at distal end of the cannula. To break the bone core at the distal stem of the bone dowel, a third cannula is inserted into the first cannula. The third cannula creates pressure by pushing the bone dowel against the wall of the cannula. Turning the two cannulas simultaneously, breaks the stem of the core leaving the bone dowel trapped inside the cannula. Retrieving the cannula from the body brings with it the bone dowel.

The devices described herein are useful to facilitate minimally invasive or percutaneous bone grafting procedures. The device lengths and gauges are meant to fit one through each other, i.e. a cannula having an 8-gauge inner diameter allows another cannula or stylet having a 11-gauge outer diameter to pass through it.

The posts and wires illustrated in the figures, e.g., FIGS. 1-6, can be at least 0.5 inches (1.3 centimeters) long and preferably about 2 inches (5.1 centimeters) long.

Example Bone Marrow Aspiration Device:

At least one first, outer cannula that has at least a second, inner cannula that coaxially fits through and extends at least 2 centimeters but less than 8 centimeters beyond the distal end of the first cannula. The second cannula has a handle, the cannula handle can be coupled to a stylet handle attached to a removable stylet that fit coaxially through the second cannula, the stylet has an adapter on the proximal end that is meant to connect to a drill. The stylet handle is configured to mate with the handle of the second cannula. The stylet has a length that extends beyond the end of the second cannula when the two handles are connected. The distal end of the stylet and second cannula are designed to penetrate bone. The assembly of first cannula, second cannula and stylet rotates together when powered by a drill. A screw set (screw mechanism) includes a lead screw attached to the second cannula and a threaded nut/threaded member in a housing (e.g., a threaded handle) attached to the first cannula that, when assembled, allow the second cannula to be retracted through the first cannula with rotation of the handle of the second cannula. The second cannula can have one or more side apertures near its distal end, the apertures being less than 2 centimeters from the distal end of the cannula. A detachable T-shaped handle (e.g., a winged handle) that fits or otherwise mates with the handle of the second cannula can be added to assist with rotation of the handle of the second cannula. The device includes a third cannula (e.g., an aspiration cannula) that passes through the second cannula and that closes off the distal end of the cannula but leaves at least one side aperture open. The first cannula is preferably 8 gauge, the second cannula is preferably 11 gauge, and the third cannula 14 gauge. An example embodiment of such an aspiration device is illustrated in FIG. 7.

Example Bone Dowel Capture Device:

A bone dowel capture device includes at least one first cannula that can have a tapered swage distal end with a cannula handle on the proximal end. The cannula handle can be mated or coupled to at least two removable handles but preferably three handles, as illustrated in FIGS. 1 and 2.

The first removable handle is attached to a stylet. The stylet fits coaxially through the first cannula and has a handle that has an adapter on the proximal end that is configured to connect directly to the chuck of a drill. The stylet handle is configured to mate with the handle of the cannula. The stylet has a length on the proximal end that extends beyond the end of the first cannula when the two handles are connected and is designed to penetrate bone. The stylet and handle rotate in tandem when powered by a drill.

The second removable handle has an adapter on the proximal end designed to connect to the chuck of a drill, e.g., a handle with a K-wire adapter. The handle is configured to mate with the handle of the first cannula when the two handles are connected and the two handles rotate in tandem when powered by a drill.

The second removable handle can be attached to a stylet on the proximal end that has a length that does not extend beyond the end of the first cannula when the two handles are connected and is designed to leave at least one centimeter but preferably 4 or more centimeters of the cannula hollow.

A second cannula (e.g., a spoon cannula) can be attached to a third removeable handle. This second cannula fits coaxially into the first cannula and has a length that is approximately equal to the first cannula when the two handles are connected. A length of the distal end of the second cannula has a portion of the circumference of the cannula removed, this partial circumference is at least 1 centimeter but preferably 4 or more centimeters and can match the length of hollow needle present when the second stylet is assembled into the first cannula.

Example Handle Design:

The device includes a distal (e.g., first) cannula attached to a distal (e.g., first) handle and at least one proximal (e.g., second) handle attached to a solid stylet or a cannula (e.g., second cannula), the proximal handle fits into the distal cannula handle and the stylet or cannula attached to the proximal handle fits coaxially through the center of the distal cannula. The proximal handle can have a K-wire or tube (e.g., a cannulated post) running through the center of the handle and extending beyond the proximal end of the handle. The solid K-wire or tube is designed to cooperate directly with standard O.R. sterile drills. The handle mates with the drill like any typical O.R. drill bit or accessory.

A solid stylet can be attached to the proximal handle. The distal cannula can be attached to a distal handle. The proximal handle attached to a stylet fits into the distal handle attached to the distal cannula. The mating feature(s) of the two handles, when joined together, allows the stylet and proximal stylet handle to rotate partially in either direction independently of the distal cannula and cannula handle. The mating feature(s) of the two handles, when joined together and only after the proximal stylet and handle have rotated partially in either direction, can allow the proximal stylet and proximal stylet handle to rotate together with the distal cannula and distal cannula handle.

The tip of the distal cannula can have a taper such that the inner diameter of the distal end of the cannula is smaller than the proximal end.

The length of the solid stylet that extends beyond the proximal handle into the distal cannula can be of varied lengths. Specifically, one stylet tip can extend beyond the distal end of the proximal cannula and another one can be significantly shorter, leaving the distal end of the proximal cannula hollow.

The entire length of the distal cannula and distal handle can be open (patent) when used to capture the solid bone sample or a proximal portion can be closed (i.e. the cannula does need to be hollow through its entire length but it needs to be hollow at a distal end, to capture the bone sample). The proximal handle can couple to the distal handle. The proximal handle can have a K-wire attached to it to advance the coupled distal handle and distal cannula. The K-wire can be solid, thereby closing the top portion of the distal cannula.

The K-wire can be formed as a solid tube or a solid cylinder. When the K-wire is a tube, the entire length of the cannula advancing into bone is hollow. In either embodiment, the K-wire drill assembly is used to drive the hollow cannula into bone to capture a dowel in the cannula.

Physiological fluids, such as bone marrow, can be aspirated using double-cannula needle assemblies. Examples of such approaches are described in the following patent applications:

Apparatus and methods for aspirating and separating components of different densities from a physiological fluid containing cells are described in International Application No. PCT/US2010/036696, filed on May 28, 2010 and published on Dec. 2, 2010 as WO2010/138895 A2.

Apparatus and methods for aspirating tissue are described in International Application No. PCT/US2013/067358, filed on Oct. 29, 2013 and published on May 8, 2014 as WO2014/070804 A1.

An aspiration device and associated method including an introducer needle assembly, an aspiration needle assembly and a screw assembly are described in International Application No.: PCT/US2015/011614, filed on Jan. 15, 2015 and published on Jul. 23, 2015 as WO2015/109100 A1.

An aspiration device and method including an introducer cannula, an aspiration cannula and a mechanism (e.g., a screw assembly) to move the cannulae are described in U.S. application Ser. No. 14/885,821, filed on Oct. 16, 2015 and published on Apr. 21, 2016 as US 2016/0106462 A1.

A flexible cannula with a double helix spring coil is described in U.S. application Ser. No. 16/881,865, filed May 22, 2020 and published on Nov. 26, 2020 under Publication No. US 2020/0367914 A1.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A bone marrow aspiration device, the device comprising:
    an outer cannula connected to an outer handle at a proximal end of the outer cannula;
    a first cannula that fits coaxially through the outer cannula and extends beyond a distal end of the outer cannula, the first cannula including at least one side aperture near a distal end of the first cannula, the first cannula connected to a first handle at a proximal end of the first cannula, the first handle including a mating feature that includes a keyway, the keyway including a central recess and adjacent ridges;
    a removable sharp stylet that fits coaxially through the first cannula, the stylet connected to a stylet handle that includes a mating feature to engage with the mating feature of the first handle, the mating feature of the stylet handle including a key, the key including a finger receivable in the central recess of the keyway with a linear motion of the finger, the finger including a slot to engage one of the ridges of the keyway with a rotational motion of the finger, to couple the stylet handle to the first handle, the stylet having a length such that a distal end of the stylet extends beyond the distal end of the first cannula when the stylet handle and first handle are coupled, the distal end of the stylet and the distal end of first cannula configured to penetrate bone, a proximal end of stylet forming an adapter to couple to a drill, the first cannula and stylet rotating together when driven by the drill coupled to the adapter;

a screw mechanism formed by a lead screw extending from the first handle and engaging a threaded portion of the outer handle, the screw mechanism allowing the first cannula to be retracted through the outer cannula with rotation of the first handle relative to the outer handle; and a second cannula that fits coaxially through the first cannula once the stylet is removed, a distal end of the second cannula configured to close off the distal end of the first cannula and leave open the at least one side aperture of the first cannula, the second cannula defining a lumen to aspirate bone marrow through the at least one open side aperture.

2. The aspiration device of claim 1, wherein the outer cannula is 8 gauge, the first cannula is 11 gauge, and the second cannula is 14 gauge.

3. The aspiration device of claim 1, wherein the first cannula extends at least 2 centimeters but less than 8 centimeters beyond the distal end of the outer cannula.

4. The aspiration device of claim 1, wherein the distal end of the outer cannula is blunt, to enable the outer cannula to rest against but not penetrate the bone.

5. The aspiration device of claim 1, wherein the second cannula includes a distal luer connector to connect to a luer connector at the first cannula in an air-tight manner.

6. The aspiration device of claim 5, wherein the second cannula includes a proximal luer connector to connect to a syringe in an air-tight manner.

7. The aspiration device of claim 1, wherein the one or more side apertures of the first cannula are less than 2 centimeters from the distal end of the first cannula.

8. The aspiration device of claim 1, further including a detachable winged handle that is configured to couple to the first handle of the first cannula to assist with rotation of the first handle.

9. The aspiration device of claim 1, further including a removable blunt stylet that fits coaxially through the first cannula once the sharp stylet is removed, the blunt stylet connected to a blunt stylet handle that includes a mating feature to engage with the mating feature of the first handle, to couple the blunt stylet handle to the first handle, the blunt stylet having a length such that a distal end of the stylet extends beyond the distal end of the first cannula when the blunt stylet handle and first handle are coupled.

10. The aspiration device of claim 1, wherein the screw mechanism causes relative linear motion between the outer cannula and the first cannula with relative rotation of the outer handle and the first handle.

11. A method for aspirating bone marrow using the aspiration device of claim 1, the method comprising:
inserting the first cannula and the sharp stylet of the aspiration device into bone;
removing the sharp stylet;
inserting the second cannula through the first cannula, the distal end of the second cannula closing off the distal end of the first cannula and leaving open the at least one side aperture of the first cannula;
moving the outer cannula towards the bone and relative to the first cannula using the screw mechanism by rotating the outer handle relative to the first handle;
aspirating bone marrow through the at least one open side aperture;
retracting the first cannula and second cannula from the bone and through the outer cannula using the screw mechanism by rotating the first handle relative to the outer handle; and
aspirating additional bone marrow through the at least one open side aperture.

12. A bone access device, comprising:
a cannula having a proximal end and a distal end and defining a lumen between the distal and proximal ends, the distal end configured to penetrate a bone of a patient and the proximal end connected to a cannula handle, the cannula handle defining a keyway including at least two ridges adjacent a central recess;
a removable stylet having a proximal end and distal end, the stylet receivable in the lumen of the cannula and configured to extend beyond the distal end of the cannula, the distal end of the stylet configured to penetrate the bone of the patient, the proximal end of the stylet extending through a stylet handle connected to the stylet, the proximal end forming a post that protrudes from the stylet handle and that is shaped and sized to fit a drill, the stylet handle and cannula handle configured to mate such that the stylet and stylet handle can rotate independently of the cannula and cannula handle in clockwise and counter clockwise directions for a limited amount of rotation before both the cannula handle and connected cannula and the stylet handle and connected stylet rotate together, the stylet handle defining a key receivable in the keyway, to mate the stylet handle to the cannula handle, the key including a finger receivable in the central recess of the keyway with a linear motion of the finger, the finger including a slot to engage one of the ridges of the keyway with a rotational motion of the finger.

13. The bone access device of claim 12, wherein the keyway includes a first keyway on one side of the cannula handle and a second keyway on an opposite side of the cannula handle, and wherein the key includes a first key receivable in the first keyway and a second key receivable in the second keyway.

14. The bone access device of claim 13, wherein the first and second keyways include respective first and second recesses in the cannula handle, and wherein the first and second keys are respective first and second fingers extending from the stylet handle.

15. The bone access device of claim 14, wherein the first and second recesses are each defined by two sidewalls connected by a convex surface, the first and second fingers each defining a concave surface complimentary to the convex surface.

16. The bone access device of claim 14, wherein the first finger includes a lip formed at an end of the first finger and wherein the slot is formed along a length of the first finger.

17. The bone access device of claim 16, wherein the lip of the first finger is receivable in the central recess with the linear motion of the first finger.

18. The bone access device of claim 12, wherein the proximal end of the stylet protrudes at least 2.5 centimeters beyond the stylet handle.

19. The bone access device of claim 12, where the limited amount of rotation is less than 360 degrees.

20. The bone access device of claim 12, wherein the cannula handle includes a luer connector and the stylet handle includes a recess to receive the luer connector.

21. A handle system for a bone access device, the system comprising:
   a first handle connected to a proximal end of a first cannula defining a lumen, the first handle including a luer connection and defining a keyway including a central recess and adjacent ridges;
   a second handle connected to a removable stylet or a second cannula, the second handle defining a key including a finger receivable in the central recess of the keyway with a linear motion of the finger, the finger including a slot to engage one of the ridges of the keyway with a rotational motion of the finger, and the stylet or second cannula receivable in the lumen of the first cannula through the luer connection, a proximal end of the stylet or second cannula extending through the second handle, the proximal end of the stylet or second cannula forming a post that protrudes from the second handle and that is shaped and sized to fit a drill, the first handle and second handle configured to mate such that the stylet or second cannula and the second handle can rotate independently of the first cannula and first handle in both clockwise and counter clockwise directions for a limited amount less than 360 degrees of rotation before both the first handle and connected first cannula and the second handle and connected stylet or second cannula rotate together.

22. A bone dowel capture device, comprising:
   a first cannula having a tapered swage at a distal end and being connected to a first cannula handle at a proximal end, the first cannula handle defining a keyway including a central recess and adjacent ridges;
   a removable first stylet that fits coaxially through the first cannula, the first stylet connected to a first stylet handle and forming a first adapter at a proximal end to couple directly to a drill, the first stylet handle configured to mate with the first cannula handle, the first stylet having a length such that a distal end of the first stylet extends beyond the distal end of the first cannula when the first stylet handle and first cannula handle are mated, the distal end of the first stylet configured to penetrate bone, the first stylet and first cannula configured to rotate in tandem when the first stylet is driven by a drill coupled to the first adapter;
   a removable second stylet that fits coaxially through the first cannula once the first stylet is removed, the second stylet connected to a second stylet handle and forming a second adapter at the proximal end to couple directly to a drill, the second stylet handle configured to mate with the first cannula handle, the second stylet having a length such that a distal end of the second stylet does not extend beyond the distal end of the first cannula when the second stylet handle and first cannula handle are mated, the second stylet configured to leave a length of a distal portion of the first cannula hollow, the second stylet and first cannula configured to rotate in tandem when the second stylet is driven by a drill coupled to the second adapter;
   wherein at least one of the first stylet handle or the second stylet handle includes a key, the key including a finger receivable in the central recess of the keyway with a linear motion of the finger, the finger including a slot to engage one of the ridges of the keyway with a rotational motion of the finger; and
   a second cannula that fits coaxially through the first cannula once the second stylet is removed, the second cannula connected to a second cannula handle, the second cannula having a length such that a distal end of the second cannula extends to approximately the distal end of the first cannula, the distal end of the second cannula having a portion of a circumference along a length of the second cannula removed, the removed portion having a length of about the length of the distal portion of the first cannula that the removal second stylet leaves hollow, the second cannula configured to cooperate with the first cannula to capture a bone dowel in the hollow distal portion of the first cannula.

23. The bone dowel capture device of claim 22, wherein the second stylet is configured to leave a length of at least one centimeter of a distal portion of the first cannula hollow.

24. The bone dowel capture device of claim 23, wherein the length of the hollow distal portion of the first cannula is 4 or more centimeters.

25. The bone dowel capture device of claim 22, wherein the second cannula forms a third adapter at the proximal end to couple directly to a drill, the second cannula handle configured to mate with the first cannula handle.

26. The bone dowel capture device of claim 25, wherein at least one of the first, second, and third adapters is a K-wire adapter.

* * * * *